United States Patent
Dialani et al.

(10) Patent No.: US 11,017,040 B2
(45) Date of Patent: May 25, 2021

(54) PROVIDING QUERY EXPLANATIONS FOR AUTOMATED SOURCING

(71) Applicant: Microsoft Technology Licensing, LLC, Redmond, WA (US)

(72) Inventors: Vijay Dialani, Fremont, CA (US); Sahin Cem Geyik, Redwood City, CA (US); Abhishek Gupta, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 449 days.

(21) Appl. No.: 15/852,523

(22) Filed: Dec. 22, 2017

(65) Prior Publication Data

US 2018/0239829 A1    Aug. 23, 2018

Related U.S. Application Data

(60) Provisional application No. 62/460,390, filed on Feb. 17, 2017.

(51) Int. Cl.
*G06F 16/9535* (2019.01)
*G06Q 10/06* (2012.01)
(Continued)

(52) U.S. Cl.
CPC . *G06F 16/9535* (2019.01); *G06Q 10/063112* (2013.01); *G06Q 10/1053* (2013.01); *G06Q 50/01* (2013.01); *G06F 16/30* (2019.01)

(58) Field of Classification Search
CPC .... G06F 16/35; G06F 16/242; G06F 16/2455; G06F 16/30; G06F 16/9535;
(Continued)

(56) References Cited

U.S. PATENT DOCUMENTS 9,830,392 B1    11/2017    Garg et al.
10,373,171 B2    8/2019    Ryabchun et al.
(Continued)

OTHER PUBLICATIONS

Sadikov, Eldar; Madhavan, Jayant; Wang, Lu; Halefy, Alon. Clustering Query Refinements by User Intent. Apr. 2010.*
(Continued)

*Primary Examiner* — Johnna R Loftis
(74) *Attorney, Agent, or Firm* — Schwegman Lundberg & Woessner, P.A.

(57) ABSTRACT

Techniques for providing explanations of candidate search queries are described. The queries can be created using query intent clustering in an automated sourcing tool. In an example embodiment, disclosed is a system that obtains one or more current candidate member profiles used as a basis for a search on member profiles in an online system. Additionally, the system extracts one or more attributes from the one or more current candidate member profiles. Moreover, the system identifies query intent clusters based on the extracted one or more attributes. Furthermore, the system generates a search query based on the identified query intent clusters. Next, an explanation of the search query can be displayed on a display device of the system. In some embodiments, the online system hosts a social networking service that includes the member profiles, and the identified query intent clusters include skills clusters.

19 Claims, 16 Drawing Sheets

(51) Int. Cl.
*G06F 16/30* (2019.01)
*G06Q 50/00* (2012.01)
*G06Q 10/10* (2012.01)

(58) Field of Classification Search
CPC ............... G06Q 10/1053; G06Q 50/01; G06Q 10/063112; H04L 67/306
USPC .......................................... 705/7.14; 707/706
See application file for complete search history.

(56) References Cited

U.S. PATENT DOCUMENTS

| | | | |
|---|---|---|---|
| 10,628,506 B2 | 4/2020 | Dialani et al. | |
| 2006/0229896 A1 | 10/2006 | Rosen et al. | |
| 2010/0169300 A1* | 7/2010 | Liu | G06F 16/951 707/709 |
| 2011/0145348 A1 | 6/2011 | Benyamin et al. | |
| 2011/0208730 A1* | 8/2011 | Jiang | G06F 16/951 707/727 |
| 2012/0203584 A1 | 8/2012 | Mishor et al. | |
| 2012/0226681 A1 | 9/2012 | Paparizos et al. | |
| 2013/0124497 A1 | 5/2013 | Lin et al. | |
| 2013/0246383 A1* | 9/2013 | White | G06F 16/9535 707/706 |
| 2013/0325838 A1 | 12/2013 | Liao | |
| 2014/0180770 A1 | 6/2014 | Baeck et al. | |
| 2014/0207746 A1* | 7/2014 | Song | G06F 16/3322 707/706 |
| 2015/0095121 A1 | 4/2015 | Bastian et al. | |
| 2015/0262081 A1 | 9/2015 | Rodriguez et al. | |
| 2015/0324440 A1* | 11/2015 | Subramanian | G06F 16/951 707/694 |
| 2016/0021141 A1 | 1/2016 | Liu et al. | |
| 2016/0034464 A1* | 2/2016 | Sinha | H04L 67/306 707/732 |
| 2016/0092506 A1 | 3/2016 | Liu et al. | |
| 2016/0155067 A1 | 6/2016 | Dubnov et al. | |
| 2016/0203221 A1* | 7/2016 | Rao | G06Q 50/01 707/707 |
| 2016/0321367 A1 | 11/2016 | Arya et al. | |
| 2016/0321614 A1 | 11/2016 | Leslie | |
| 2017/0337202 A1* | 11/2017 | Arya | G06F 16/3338 |
| 2017/0344554 A1 | 11/2017 | Ha et al. | |
| 2017/0344555 A1 | 11/2017 | Yan et al. | |
| 2017/0344556 A1 | 11/2017 | Wu et al. | |
| 2017/0344954 A1 | 11/2017 | Xu et al. | |
| 2017/0364596 A1 | 12/2017 | Wu et al. | |
| 2018/0060387 A1* | 3/2018 | Le | G06F 16/24534 |
| 2018/0232421 A1* | 8/2018 | Dialani | G06Q 10/06 |
| 2018/0232434 A1* | 8/2018 | Geyik | G06Q 10/1053 |
| 2018/0232702 A1* | 8/2018 | Dialani | G06Q 50/01 |
| 2018/0239830 A1 | 8/2018 | Dialani et al. | |

OTHER PUBLICATIONS

Sadikov, Eldar; Madhavan, Jayant; Wang, Lu; Halevy, Alon. Clustering Query Refinements by User Intent. WWW 2010, Apr. 26, 30, 2010. Raleigh, NC, USA.*
"Non Final Office Action Issued in U.S. Appl. No. 15/827,308", dated Jan. 7, 2020, 10 Pages.
"Non Final Office Action Issued in U.S. Appl. No. 15/851,584", dated Mar. 6, 2020, 16 Pages.
"Final Office Action Issued in U.S. Appl. No. 15/852,491", dated Mar. 6, 2020, 25 Pages.
"Non Final Office Action Issued in U.S. Appl. No. 15/852,491", dated Oct. 29, 2019, 20 Pages.
"Final Office Action Issued in U.S. Appl. No. 15/852,560", dated Dec. 13, 2019, 15 Pages.
"Non Final Office Action Issued in U.S. Appl. No. 15/852,560", dated Sep. 6, 2019, 38 Pages.
Bhattarai, Shishir, "Interactive Intent Modeling: Usefulness of Session-level Relevance Feedback", In Master's Thesis Submitted to School of Science, Aalto University, Sep. 24, 2016, 49 Pages.
Duan, Huizhong, "Intent Modeling and Automatic Query Reformulation for Search Engine Systems", In Dissertation for the Degree of Doctor of Philosophy in Computer Science, the University of Illinois at Urbana-Champaign, 2013, 139 Pages.
Geyik, et al., "In-session Personalization for Talent Search", In Proceedings of the 27th ACM International Conference on Information and Knowledge Management, Oct. 22, 2018, pp. 2107-2115.
Ha-Thuc, et al., "From Query-By-Keyword to Query-By-Example: Linkedin Talent Search Approach", In Proceedings of the ACM on Conference on Information and Knowledge Management, Nov. 6, 2017, pp. 1737-1745.
Ha-Thuc, et al., "Learning to Rank Personalized Search Results in Professional Networks", In Proceedings of the 39th International ACM SIGIR Conference on Research and Development in Information Retrieval, Jul. 17, 2016, pp. 461-462.
Ha-Thuc, et al., "Personalized Expertise Search at LinkedIn", In Proceedings of IEEE International Conference on Big Data, Oct. 29, 2015, 10 Pages.
Liao, Yiping, "Interactive Intent Modeling Based on Probabilistic Sparse Models", In Master's Thesis Submitted to School of Science, Aalto University, Jan. 19, 2017, 56 Pages.
Yu, et al., "Latent Dirichlet Allocation based Diversified Retrieval for E-commerce Search", In Proceedings of the 7th ACM International Conference on Web Search and Data Mining, Feb. 24, 2014, 10 Pages.
"Non Final Office Action Issued in U.S. Appl. No. 15/827,308", dated Jul. 21, 2020, 10 Pages.
"Non Final Office Action Issued in U.S. Appl. No. 15/851,584", dated Sep. 3, 2020, 15 Pages.
"Final Office Action Issued in U.S. Appl. No. 15/827,308", dated Jan. 25, 2021, 10 Pages.

* cited by examiner

FIG. 5

PROVIDING QUERY EXPLANATIONS FOR AUTOMATED SOURCING

PRIORITY CLAIM

This application claims the benefit of priority to U.S. Provisional Patent Application No. 62/460,390 entitled "Providing Query Explanations for Automated Sourcing", [reference number 901991-US-PSP (3080.H85PRV)] filed Feb. 17, 2017, which is incorporated herein by reference in its entirety.

TECHNICAL FIELD

The present disclosure generally relates to computer technology for solving technical challenges in communicating and presenting logic used in search queries. More specifically, the present disclosure relates to providing explanations of queries used to create a stream of candidates to assist with query evaluation and debugging.

BACKGROUND

The rise of the Internet has occasioned two disparate phenomena: the increase in the presence of social networks, with their corresponding member profiles visible to large numbers of people, and the increase in use of social networks for job searches, by applicants, employers, and recruiters. Employers, and recruiters attempting to connect candidates and employers, often perform searches on social networks to identify candidates who have qualifications that make them good candidates for whatever job opening the employers or recruiters are attempting to fill. The employers or recruiters then can contact these candidates to see if they are interested in applying for the job opening.

Traditional querying of social networks for candidates involves the employer or recruiter entering one or more search terms to manually create a query. A key challenge in talent search is to translate the criteria of a hiring position into a search query that leads to desired candidates. To fulfill this goal, the searcher has to understand which skills are typically required for the position, what are the alternatives, which companies are likely to have such candidates, which schools the candidates are most likely to graduate from, etc. Moreover, the knowledge varies over time. As a result, it is not surprising that even for experienced recruiters, developers and designers, it often requires many searching trials in order to obtain, evaluate and debug a satisfactory query.

BRIEF DESCRIPTION OF THE DRAWINGS

Some embodiments of the technology are illustrated, by way of example and not limitation, in the figures of the accompanying drawings.

FIG. 5 is a screen capture illustrating a second screen of a user interface for explaining current candidate based searches, in accordance with an example embodiment.

DETAILED DESCRIPTION

Figure 1:
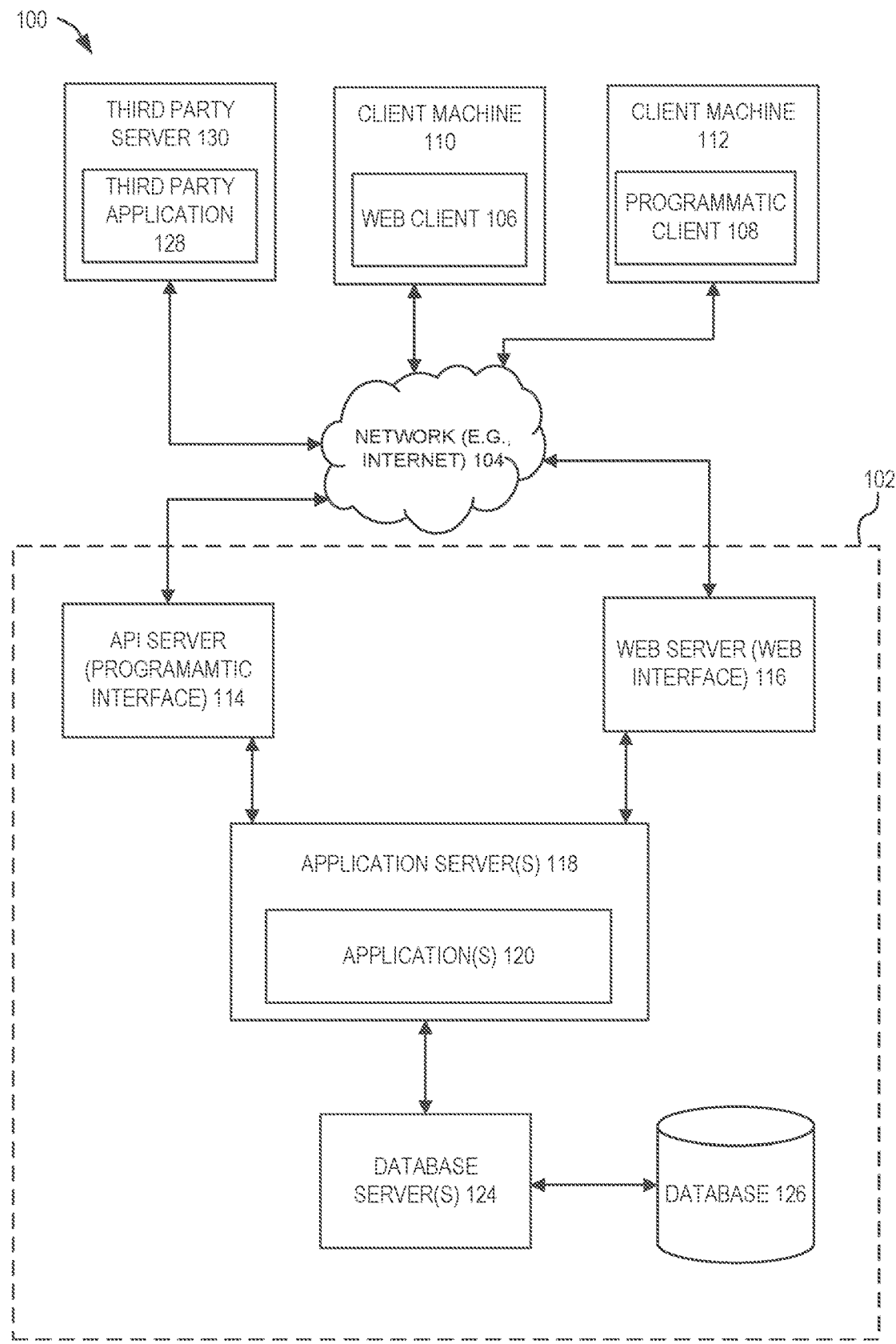
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Systems and methods are disclosed that provide human interpretable descriptions of the current and the past results of an automated sourcing tool or an intelligent matches tool (e.g., current and past candidate recommendations from a set or stream of candidates). These systems and methods also provide an overall visibility into the online optimization of the automated sourcing tool.

Techniques explain logic used to provide candidate recommendations to hiring managers. The explanations are provided to developers and designers so that they can understand the logic. Query intents are combined with reinforcement learning to update the query intents according to explicit and implicit feedback. A multi-armed bandit (MAB) solution is also used, where each arm represents an intent, and weights of these arms are determined based on recruiter feedback. The techniques provide a verbatim interpretation of how feedback for a candidate was assimilated into a ranking scheme. The techniques also provide an explanation of how parameters for the intents and the MAB change. The explain functionality improves the ability of developers and designers to evaluate and debug the recommendation process.

In an example embodiment, a system is provided that provides an explain functionality for automated sourcing or intelligent matching. The explain functionality aims to help users such as consumers of system recommendations, developers and the designers of an automated sourcing tool to be able to understand the logic with which the tool provides candidate recommendations to end users such as recruiters and hiring managers. The explain functionality helps expedite recommendation debugging process and provides trust in the automated sourcing tool and the recommendations the tool provides (e.g., candidate recommendations).

Techniques and user interfaces disclosed herein explain a machine learning approach so that a user can have confidence in the approach, as well as evaluate the validity of approaches by looking at a human readable representation of the reasoning and rationales behind an action by a machine learning model, such as, for example, a classification, a value estimation, and a candidate/item recommendation.

In the context of automated sourcing and intelligent matches, embodiments use utilize query intents combined with the reinforcement learning approach, which both update the intents according to explicit and implicit feedback. Embodiments also utilize MAB solutions where each arm represents an intent, and the choice of weights of these arms are determined due to end user (e.g., recruiter) feedback. Explain functionality provided by the example techniques can provide a verbatim interpretation of how the feedback for a candidate was assimilated into the ranking scheme, and how the parameters for intents, as well as arms of the multi-armed bandits, change. With this functionality, both designers and engineers have the ability to evaluate and debug the recommendation process. That is explanations of recommendations can drastically improve the development and operation of automated sourcing tools.

At each point in time that an automated sourcing tool recommends a candidate, the tool can receive a response (i.e., feedback) from an end user (e.g., a hiring manager). Example interfaces (see, e.g., FIGS. 4 and 5), show how intents look and how feedback from a previous round of candidate selections, deferrals, or rejections has affected current recommendations.

The hiring manager can be an end user of the automated sourcing tool. Embodiments explain sequences of events that lead to candidate recommendations. That is, the user interfaces do not just display one recommendation at one point in time, but instead explain recommendations at multiple points in time. In this way, the user interfaces can explain why candidates whose tenure/experience level was below a threshold in the past may be selected at other points in time.

Techniques disclosed herein explain logic behind candidate recommendations. The retrieval queries can be built using a query intent clustering functionality that is utilized to generate a soft clustering of candidates (e.g., for a specific job/position or title and geographic location such as a city or region). Each cluster can be represented by a search query composed of standardized entities such as skills, title, and geographic codes. In additional or alternative embodiments, other criteria such as, for example, education and seniority, can also be used in conjunction. In embodiments, there is the capability to update search queries for a specific stream during operation of the automated sourcing tool. For example, techniques can potentially update the search query based on feedback from the end user (e.g., a recruiter), by updating weights for the search terms. This capability is discussed within the context of the explanation functionality described herein.

Techniques disclosed herein also explain logic behind candidate search queries that are updated based on a MAB solution. Embodiments use a MAB solution as a framework that aims to solve the exploration-exploitation problem. The MAB solution can consist of a set of arms which return a reward from an unknown non/stationary distribution (sometimes differing according to current context, i.e., contextual bandits) each time they are pulled. The problem is finding the balance in trying the arms and estimating the distributions with which each arm returns its reward (exploration), and being able to utilize the 'best' arm as frequently as possible (exploitation). Within the context of intelligent matches and automated sourcing, some embodiments utilize each query intent as a separate arm. The rewards are the feedback received from the user for the ranked set of candidates recommended by an arm, and at each step certain embodiments decide the arm from which the embodiments choose to show a candidate from (i.e., pull the arm).

The following paragraphs present the details of the explanation functionality in an automated sourcing context. There are a set of questions are answered in the paragraphs below, which provide example embodiments of the explanation functionality and its design.

To whom the explanation will be given: The explanation of search queries can be presented to software engineers that develop and maintain an automated sourcing tool or application, as well as the tool's design team members (e.g., designers) so that they can evaluate the process with which the tool recommends candidates via the explanation functionality in question. The explanations can also be given to end users, so that it helps them to contextualize how their feedback was incorporated to produce the current recommendation.

When is the explanation to be given: embodiments can provide query explanations at each candidate recommendation. That is, after an automated sourcing tool or an intelligent matches tool receives feedback (from an end user such as a recruiter) for a current candidate$_t$ (i.e., a candidate recommended at time/step t), the recommendation logic can generate the candidate$_{t+1}$ (i.e., a candidate recommended at time/step t+1), and an explanation of why the tool chose candidate$_{t+1}$, as well as how the latest user feedback affected a model used to choose the candidates.

What needs to be explained: embodiments explain the following information:

(1) The logic behind the current arm (intent) to serve the candidate from. This logic can include clues about the arm selection algorithm and explain specifically why the current arm was chosen compared to the other arms. In an embodiment, this information can be obtained by comparing the performance via the historical feedback within the current stream.

(2) Explanation of why the current candidate was chosen from the current arm. Each arm is linked directly to a query intent cluster, and hence a search query. An embodiment clearly explains the search criteria for the arm, and present some type of intuition to why the candidate was chosen at its current rank from the current arm.

(3) Explanation of how the latest feedback affected the model. The latest feedback (i.e., feedback from an end user such as a recruiter) can affect the model in two ways: (i) by updating MAB parameters which are the accumulated performance information at each arm level (already in the current model); and (ii) by updating the query parameters pertaining to the arm that served the candidate for which the feedback was received.

How much detail needs to be explained: Since both technical and non-technical users may observe the explanation function, embodiments simplify the mathematical output of the explanation function. In certain embodiments, the explain function does not refrain from providing the technical details of search and query decision logic as well, since it will further help a certain subset of the observers (e.g., technical users such as developers and designers of an automated sourcing tool).

According to some embodiments, the information that is presented and revealed is as follows:

(1) Multi-armed bandit explanation: an embodiment returns the following information for each run of selecting or choosing an arm/intent to recommend a candidate from:

(a) Per each arm: an embodiment presents or displays the intent/arm identifier (arm ID), and the performance information (number of pulls, success, Upper Confidence Bound/UCB, probability of choosing arm according to Thompson sampling, and other information for each arm of the MAB solution).

(b) Ordered list of per each arm information: in an embodiment, the first element can be the arm that was chosen for the current candidate recommendation. According to embodiments, the rest of the arms can be ordered according to their past performance:

(i) UCB score in cases where a UCB based algorithm was utilized to choose the next arm, or:

(ii) Selection likelihood in cases where Thompson sampling was utilized.

(2) Query intent cluster explanation: an embodiment provides an interpretable explanation of the search query that pertains to an intent cluster utilized by a current candidate stream. In this embodiment, a list of query intents are chosen separately for each stream which can be represented by a job and location (additional or alternative embodiments can include other features such as, for example, education, skills, and seniority). Embodiments have the capability of receiving a set of urns belonging to the search query, and translating them to human readable skill names (or other criteria and features that have been utilized for a search such as education or seniority).

(3) Last candidate, last feedback, and its effect on the model parameters: Embodiments clearly explain the last candidate and its feedback as well as how it affects the model parameters. This last candidate, last feedback, and its effect on the model parameters information can easily be digested alongside current statistics (e.g., a skill weight side-by-side with the change in this weight due to the previous candidate and the feedback to that previous candidate).

(4) Combined and simplified explanation: In an embodiment, the multi-armed bandit explanation and the query intent cluster information (as well as the feedback and the feedback effect information) is combined and presented (i.e., in a user interface on a display device) so that it is fully interpretable to the observer.

Figure 4:
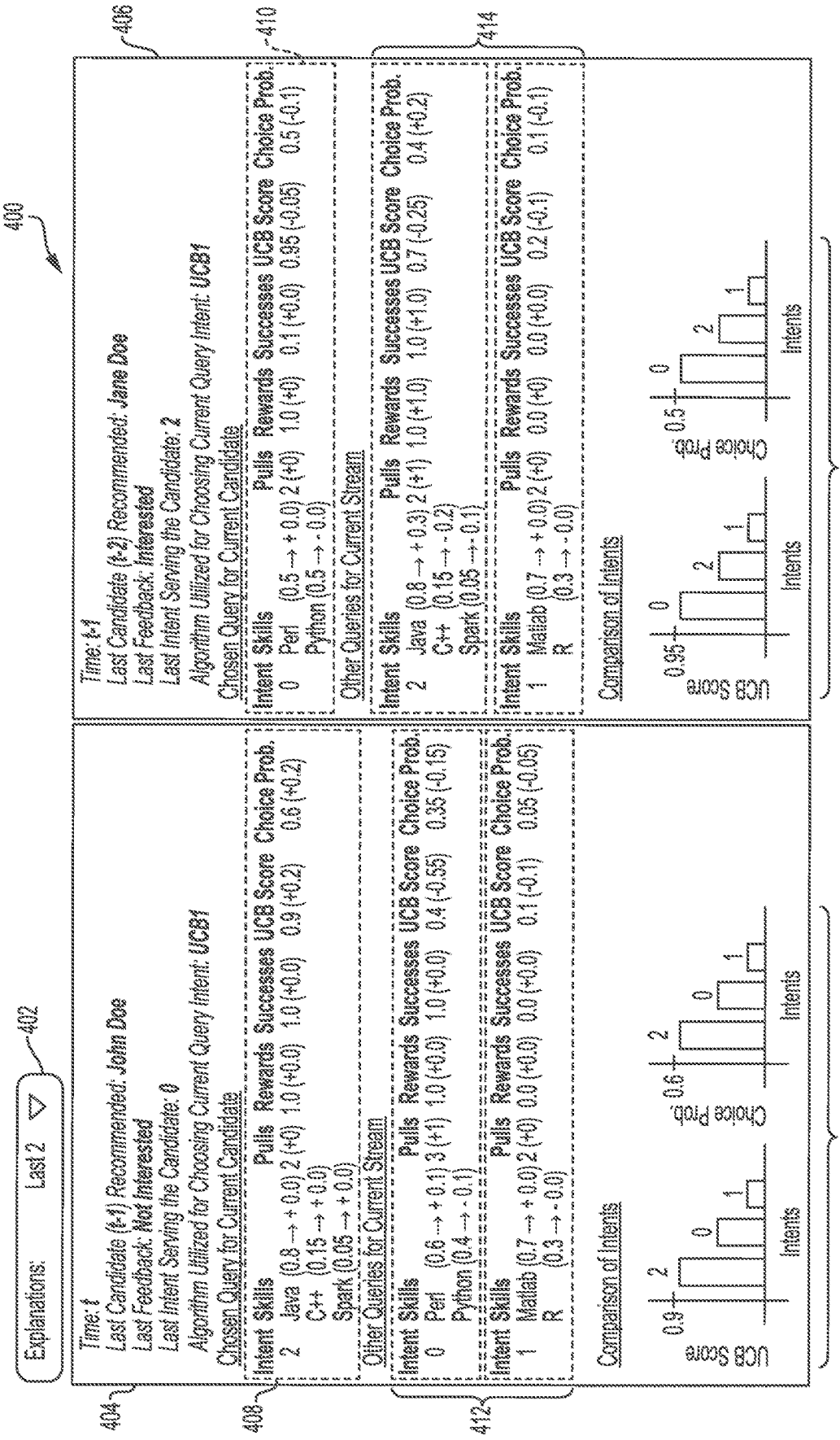
FIG. 4 is a screen capture illustrating a first screen of a user interface for explaining current candidate based searches, in accordance with an example embodiment.
Figure 5:
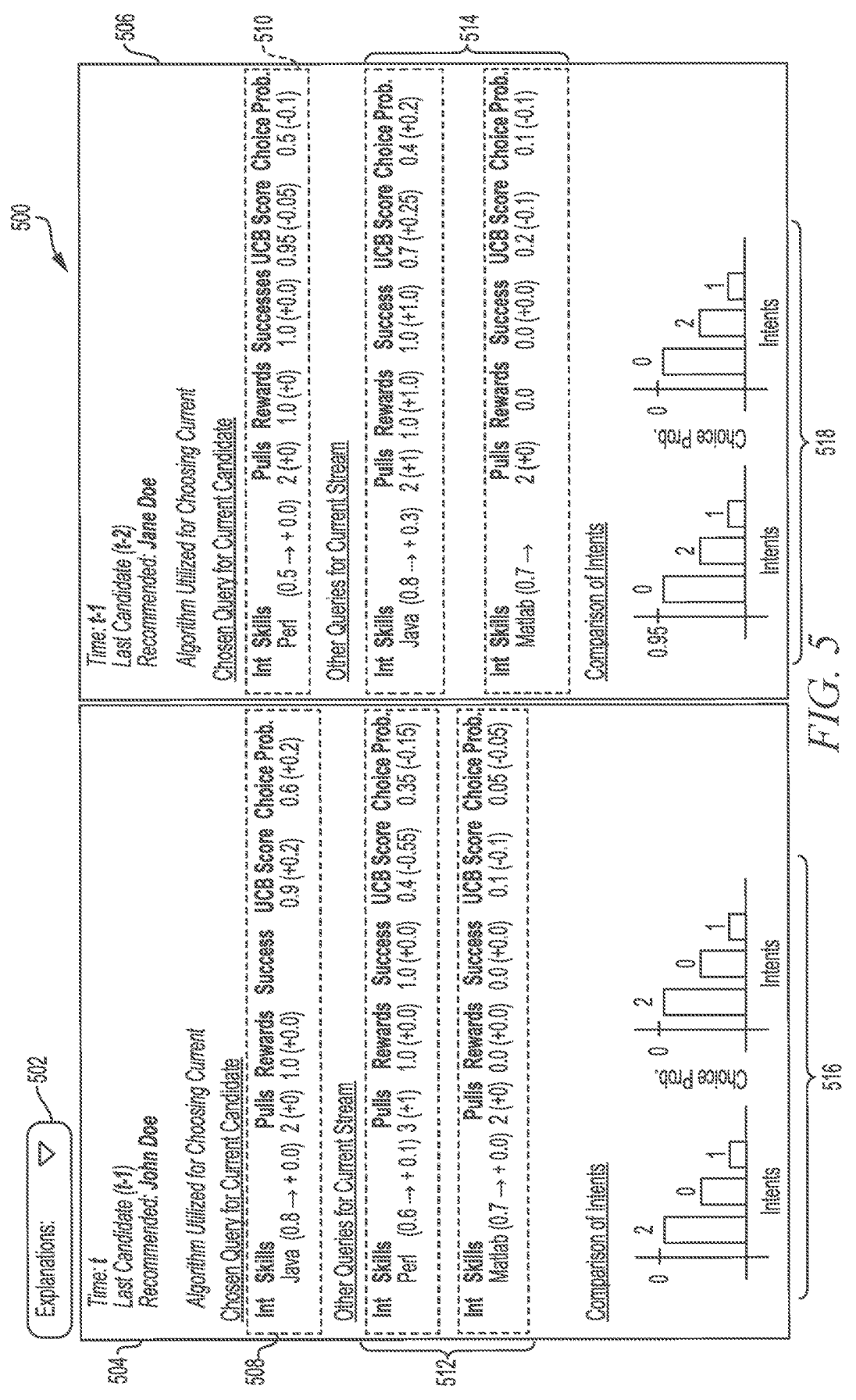

(5) Time-series explanation: In addition to explaining the current choice of the recommendation algorithm, embodiments consider a scenario where there is a need to debug a set of past decisions and feedback in an online manner. Such embodiments provide access to the previous k explanations, leading up to the current state of the recommendation system (e.g., the automated sourcing tool or the intelligent matches tool). This embodiment can provide a time-series view of the explanations at each step. An example of simple explanation user interfaces are illustrated in FIGS. 4 and 5, which are described below.

An example embodiment provides a method for providing explanations. The first step of the explanation method can start when processing the feedback from an end user (e.g., a recruiter). This feedback currently changes the arm performance statistics. In terms of generating the explanation objects, the example method will perform the following steps:

(1) The method implements a placeholder function which can receive the current arm queries, the recommended user, the feedback and return the updated set of queries (which may be exactly the same), and return the explanation object of how the arm queries (the search terms within them) has changed.

(2) Next, the method can extend functionality which updates the performance information of the arms to return an explanation object as well.

(3) Then, the method can combine the explanation information of both the intent queries and the arm performances to be able to display the type of explanation information as shown in FIGS. 4 and 5, described below.

An example implementation of an MAB library calls multiple helper functions that implement UCB and Thompson Sampling algorithms to choose the next arm. An embodiment specifically suggests an ordering over the arms of the MAB as an explanation procedure, and this embodiment implements the ordering functionality within the helper functions as well. An example implementation generates the explanation object to be included in a recruiting tool, application or product, since the explanation objects can be generated as the tool, application or product is updating the models. In this way, the explanation objects can be included as part of a relevance model.

The above-noted method steps (1)-(3) and the ordering provides an explanation for a single time-step. To have the capability of showing multiple explanations as a time-series, an embodiment can also persist or save the current explanation object at each step of the candidate recommendation. The persistence can be performed at streams-mid tier.

An embodiment uses the multi-armed bandit solution combined with the query intent clusters to provide very interpretable explanations. For example, this embodiment can practically present the historical reward and pull count of each intent and immediately explain why each query intent was chosen. The explanations generate a faithful translation between an original model to a more interpretable one. One goal for explaining the machine learning models is to give confidence to end-user which utilize these models as a black box. Since the observers of the example explain functionality described herein can include the developers and designers of an automated sourcing tool or product, much less effort needs to go into simplifying the explanations (although some form of simplification can be performed as necessary for broader usage).

Example embodiments provide systems and methods for explaining query logic for a search query, where the search query is a candidate query in an automated sourcing context. In embodiments, the query is built using a query intent clustering technique. According to these embodiments, automated sourcing allows a user, such as, for example, a recruiter or hiring manager, to create a stream from a minimal set of attributes. As used herein, in certain embodiments, the term 'automated sourcing' refers to systems and methods that offer intelligent candidate suggestions to users such as, for example, recruiters, hiring managers, and small business owners. Automated sourcing enables such users to review and select relevant candidates from a candidate stream without having to navigate or review a large list of candidates. For example, automated sourcing can provide a user with intelligent suggestions automatically selected from a candidate stream or flow of candidates for a position to be filled without requiring the user to manually move through a list of thousands of candidates. In the automated sourcing context, such a candidate stream can be created based on minimal initial contributions or inputs from users such as small business owners and hiring managers.

Example embodiments provide systems and methods for query intent clustering for a search query, where the search query is a candidate query in an automated sourcing context. According to these embodiments, automated sourcing allows a user, such as, for example, a recruiter or hiring manager, to create a stream from a minimal set of features. Techniques disclosed herein enable designers, developers and other users to review and debug queries used to produce a candidate stream without having to navigate or review query code (e.g., query language code such as, for example structured query language/SQL code) Automated sourcing queries can provide a user with intelligent suggestions automatically selected from a candidate stream or flow of candidates for a position to be filled. In the automated sourcing context, such a candidate stream can be created based on query built using minimal initial contributions or inputs from users such as small business owners and hiring managers.

Instead of requiring large amounts of explicit user feedback, automated sourcing techniques infer criteria with features and information derived from the user's company or organization, job descriptions, other companies or organizations in similar industries, and implicit user feedback (e.g., feedback inferred based on recent hires or current candidates). Among many features or factors that can contribute to the criteria for including members of an online system such as a social network system in a stream of candidates, embodiments use a standardized job title and location to start a stream. In some embodiments, the online system hosts a social networking service. In certain embodiments, the social networking service is an online professional network. As a user is fed a stream of candidates, the user can assess respective ones of the candidates. This interaction information can be fed back into a relevance engine that includes logic for determining which candidates end up in a stream. In this way, automated sourcing techniques continue to improve the stream.

In certain embodiments, a user of an automated sourcing recruiting tool can create a new stream from a standardized title and location combination. In the event that the user does have a company that is standardized, and the tool has enough data on the organization or company to make it useful, an embodiment can also implicitly leverage the organization's or company's industry and other metadata to improve the immediate quality of the stream. For each new stream, a standardized title and location are used to frame the position. The search service can use the recruiting tool's suggested titles and locations to automatically broaden the search. That is, the title and location used to frame the stream are the job title the candidate will have and the location where they will work, as opposed to requiring the user to enter current titles.

Instead of requiring large amounts of explicit user feedback, automated sourcing techniques infer criteria with attributes and information derived from the user's company or organization, job descriptions, other companies or organizations in similar industries, and implicit user feedback (e.g., feedback inferred based on current candidates). Among many attributes or factors that can contribute to the criteria for including members of a social networking service in a stream of candidates, embodiments use a standardized job title and location to start a stream. In certain embodiments, the social networking service is an online professional network. As a user is fed a stream of candidates, the user can assess respective ones of the candidates. This interaction information can be fed back into a relevance engine that includes logic for determining which candidates end up in a stream. In this way, automated sourcing techniques continue to improve the stream.

According to an embodiment, a system learns attributes of current candidates as compared to the rest of a population of candidates. In certain examples, the attributes can include a combination of title and location (e.g., a candidate's job title and geographic location). The geographic location can be, for example, a metropolitan area, such as a city, a county, a town, or any other municipality.

An example system is able to represent all possible user intents through a segmentation of candidates in a given stream. The system is configured to perform such a segmentation without direct control of the search query. In an embodiment, a system is provided that generates such segmentations using a query intent clustering approach. For example, starting with a set of candidates who have recently transitioned into a title (i.e., current candidates for a given job title) specified by the stream, an embodiment represents a candidate profile as a bag of urns. In this example, an urn is an entity type associated with a member profile, where an entity type represents an attribute of the member's profile (e.g., skills, education, and experience, current and past organizations). For instance, member profiles can be uniquely identified by member attributes (i.e., urns), where the member attributes can include urns for skills (e.g., C++ programming experience) and other urns for company or organization names (e.g., names of current and former employers). Embodiments use such urns to represent member profiles as document vectors by performing latent Dirichlet allocation (LDA) to determine possible intent clusters of skills, previous companies, educational institutions, and industries to hire from. For example, each member profile can be viewed as document having a mixture of various topics (e.g., various skills, organizations, and industries). By using LDA, a set of topics can be assigned to each profile. According to these embodiments, the topic distribution is assumed to have a Dirichlet prior probability distribution. Topic vectors can be obtained by performing LDA on member profiles corresponding to a given title, and titles synonymous with the given title.

As used herein, in certain embodiments, the term 'intent cluster' refers to a grouping of inferred intents of a user such as a recruiter. Intent clusters can be based on attributes of current candidate decisions made by the user for a position or job having a given title. The query intent clustering techniques disclosed herein do not require displaying the query for editing by the user. Instead, the user's query can be tuned automatically behind the scenes. For instance, query intent clustering can be used to automatically tune a query based on feedback as a user is looking for candidates, and selects or rejects candidates in a candidate stream.

Embodiments can personalize intent clusters for a user based on the user's attributes (e.g., the user searching for a member to hire) in combination with company attributes (e.g., geographic location of a company or organization that is seeking to hire candidates). In this way, the embodiments provide customized intents for various users, such as, for example, hiring managers from different companies who are searching for different candidates (e.g., different job titles). Such customization improves efficiency for recruiting tools by providing the most relevant set of candidates quickly and not requiring users to modify or tune queries for each search.

Certain embodiments determine multiple intents represented by a candidate stream defined by attributes, such as, for example, title and location. To determine these multiple intents, embodiments cluster data for current candidates. One example data source for current candidate information includes member profiles with a given title. According to this example, this data source can also include member profiles for members whose titles match synonyms of the given title. In an additional or alternative embodiment, another source for current candidate data includes queries that lead to the profiles with this particular given title. In another embodiment, another source for current candidate data includes profiles of current candidates.

Embodiments choose current candidates as a list of candidates who are more likely to have an updated skill set and who reflect the profile of people who are able to obtain new positions corresponding to a position to be filled. Instead of relying on recruiter queries or member profiles that can result in member or recruiter search-based biases, embodiments perform query intent clustering based on current candidate data. For example, the embodiments can select members from a 100-day window ending on a given date (e.g., Jan. 31, 2017), including all member profiles for members who have changed their position or employment within the 100-day window where the members' recent titles match a given title or the title's synonyms. A user conducting the candidate search can select the particular title and synonyms for the title. For example, a small business owner, hiring manager, or recruiter can select a title of 'Software Engineer' and indicate that synonymous titles include 'Software Developer.' According to some embodiments, a user can select a title of interest (e.g., a title of a job or position the user is seeking to fill), and titles synonymous with the selected title can be retrieved from a database table or data store that maps titles to their synonyms. In response to receiving the particular, selected title, an example system can identify software engineers and software developers who changed positions during a period of interest (e.g., a 100-day window).

Embodiments exploit correlations between certain attributes of member profiles and other attributes. One such correlation is the correlation between a member's title and the member's skills. For example, within member profile data, there exists a strong correlation between title and skills (e.g., a title+skills correlation). Such a title+skills correlation can be used as a model for ranking candidates. As a first step towards generating a bootstrap query for automated sourcing, certain embodiments investigate query clusters. According some such embodiments, the query clusters include one or more skills clusters.

In an example embodiment, a system is provided whereby, given attributes from a set of input current candidates, a search query is built capturing the key information in the candidates' profiles. The query is then used to retrieve and/or rank results. In this manner, a user (e.g., a searcher) may list one or several examples of good candidates for a given position. For instance, hiring managers or recruiters can utilize profiles of existing members of the team to which the position pertains. In this new paradigm, instead of specifying a complex query capturing the position requirements, the searcher can simply pick out a small set of current candidates for the position. The system then builds a query automatically extracted from the input candidates and searches for result candidates based on this built query. In some example embodiments, the automatically constructed query can also be presented to the searcher, which helps explain why a certain result shows up in a search ranking, making the system more transparent to the searcher. Further, the searcher can then interact with the system and have control over the results by modifying the initial query.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third-party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

In some embodiments, the networked system 102 may comprise functional components of a social networking service. In some instances, the networked system 102 is an online system, such as, for example, a social network system. In certain embodiments, the networked system 102 may host a social networking service.

Figure 2:
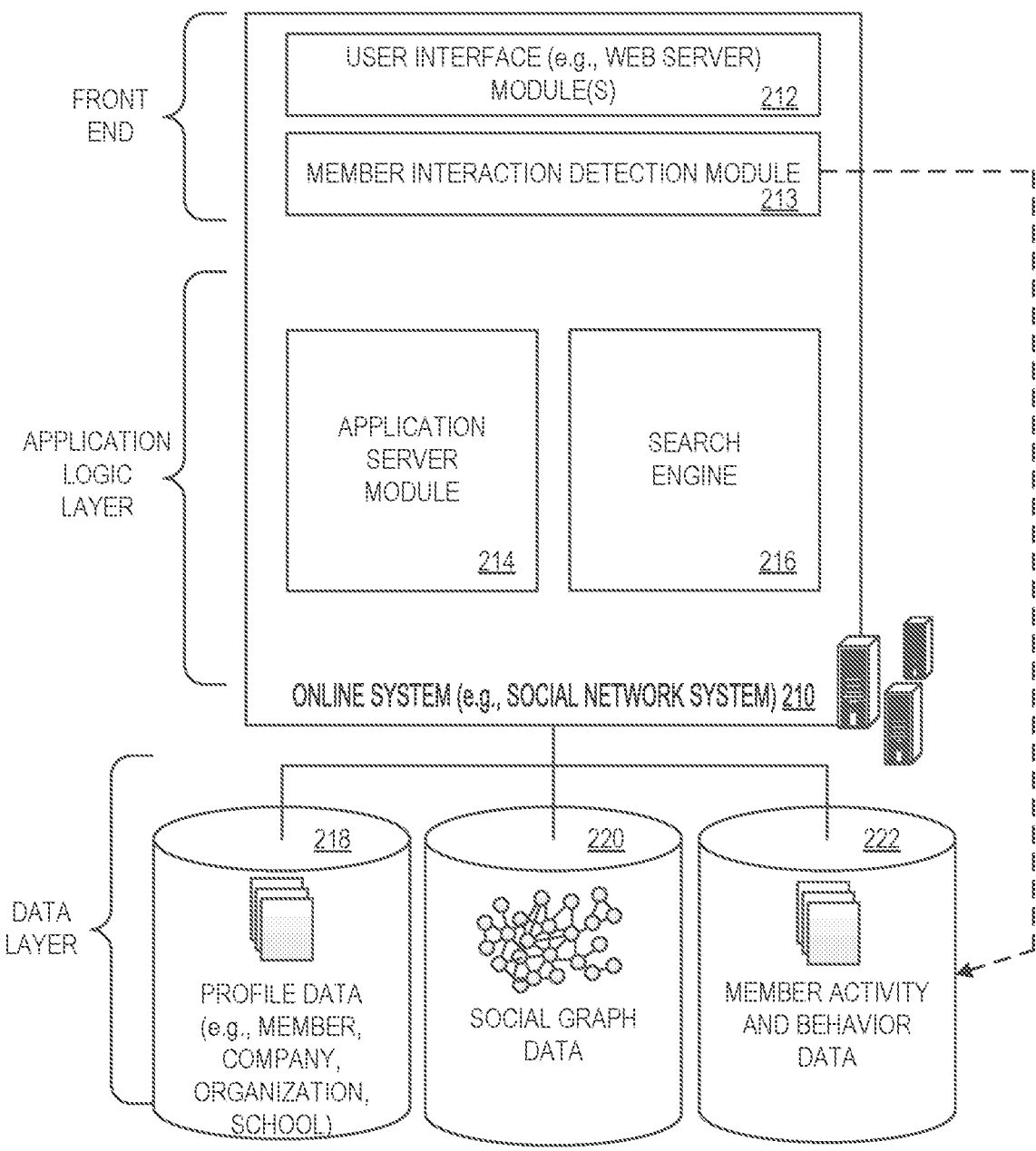
FIG. 2 is a block diagram showing the functional components of an online system hosting a social networking service, including a data processing block referred to herein as a search engine, for use in generating and providing search results for a search query, consistent with some embodiments of the present disclosure.

FIG. 2 is a block diagram illustrating components of an online system 210 (e.g., a social network system hosting a social networking service), according to some example embodiments. The online system 210 is an example of the networked system 102 of FIG. 1. In some embodiments, the online system 210 may be implemented as a social network system. As shown in FIG. 2, the online system 210 can include a data processing block referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface block (e.g., a web server 116) 212, which receives requests from various client computing devices, and communicates appropriate responses to the requesting client devices. For example, the user interface block(s) 212 may receive requests in the form of Hypertext Transfer Protocol (HTTP) requests or other web-based API requests. In addition, a member interaction detection block 213 may be provided to detect various interactions that members have with different applications 120, services, and content presented. As shown in FIG. 2, upon detecting a particular interaction, the member interaction detection block 213 logs the interaction, including the type of interaction and any metadata relating to the interaction, in a member activity and behavior database 222.

An application logic layer may include the search engine 216 and one or more various application server blocks 214 which, in conjunction with the user interface block(s) 212, generate various user interfaces (e.g., web pages) with data retrieved from various data sources in a data layer. In some embodiments, individual application server blocks 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, research institutes, government organizations, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A 'connection' may constitute a bilateral agreement by the members, such that both members acknowledge the establishment of the connection. Similarly, in some embodiments, a member may elect to 'follow' another member. In contrast to establishing a connection, 'following' another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member who is being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 shown in FIG. 1. However, other configurations are also within the scope of the present disclosure.

Although not shown, in some embodiments, the online system 210 provides an API module via which applications 120 and services can access various data and services provided or maintained by the social networking service. For example, using an API, an application may be able to request and/or receive one or more candidate selections. Such applications 120 may be browser-based applications 120, or may be operating system specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the candidate selections available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
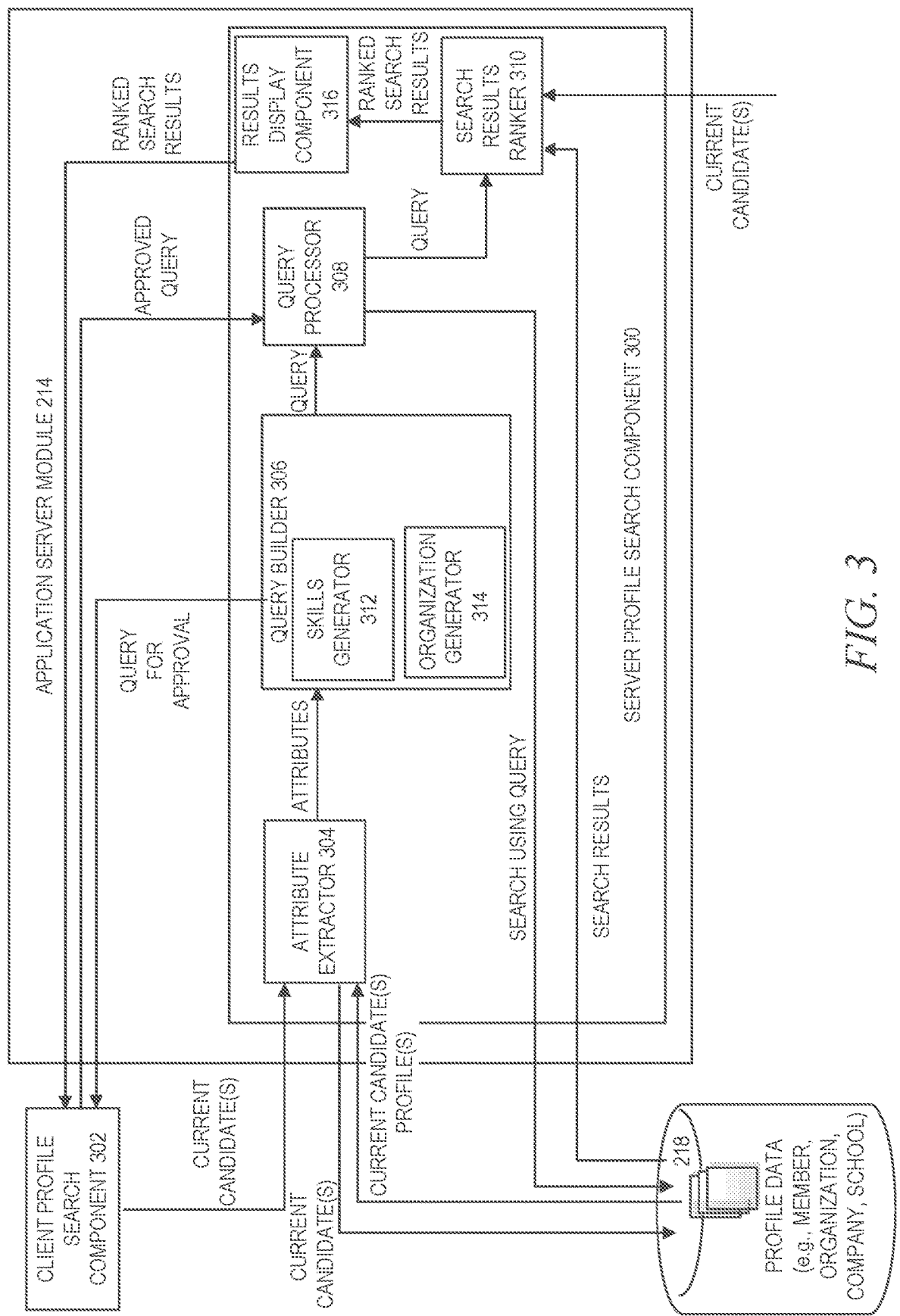
FIG. 3 is a block diagram illustrating an application server block of FIG. 2 in more detail, in accordance with an example embodiment.

FIG. 3 is a block diagram illustrating the application server block 214 of FIG. 2 in more detail. While in many embodiments, the application server block 214 will contain many subcomponents used to perform various different actions within the online system 210, in FIG. 3 only those components that are relevant to the present disclosure are depicted. Here, a server profile search component 300 works in conjunction with a client profile search component 302 to perform one or more searches on member profiles stored in, for example, the profile database 218. The server profile search component 300 may be, for example, part of a larger software service that provides various functionality to employers or recruiters. The client profile search component 302 may include a user interface and may be located on a client device. For example, the client profile search component 302 may be located on a searcher's mobile device or desktop/laptop computer. In some example embodiments, the client profile search component 302 may itself be, or may be a part of, a stand-alone software application on the client device. In other example embodiments, the client profile search component 302 is a web page and/or web scripts that are executed inside a web browser on the client device. Regardless, the client profile search component 302 is designed to accept input from the searcher and to provide visual output to the searcher.

The server profile search component 300 may contain an attribute extractor 304. The attribute extractor 304 may be implemented as a system component, block, or module that is configured to extract one or more attributes from one or more profiles of one or more current candidates (i.e., one or more current candidate profiles). For instance, the attribute extractor 304 may be configured to extract attributes, including, for example, skills, companies, titles, schools, industries, etc., from the profiles of the one or more current candidate profiles. These raw attributes are then passed to a query generator 306. The query generator 306 may be implemented as a system component, block, or module that is configured to aggregate the raw attributes across the input candidates, expand them to similar attributes, and then select the top attributes that most closely represent the current candidates. In example embodiments, for each attribute type, the query generator 306 aggregates the raw attributes across the input candidates, expands them to similar attributes, and finally selects the top attributes that most closely represent the current candidates.

After a candidate query is generated, in an example embodiment, the generated query may be shown to the searcher via the client profile search component 302 and the searcher may have the opportunity to edit the generated query. This may include adding or removing some attributes, such as skills and companies, to or from the query. As part of this operation, a query processor 308 may perform a search on the query and present raw results to the searcher via the client profile search component 302. These raw results may be useful to the searcher in determining how to edit the generated query. In addition to enabling the searcher to view and edit the generated query, embodiments also display an explanation of the generated query. Example user interfaces for displaying query explanations are provided in FIGS. 4 and 5, which are discussed below.

FIG. 4 is a screen capture illustrating a first screen of a user interface 400 for explaining current candidate based searches. The user interface 400 explains a query cluster, e.g., a candidate search query, and shows candidate information such as skills. The user interface 400 can provide a time-series view of the explanations at each step. In particular, the user interface 400 includes a drop down menu 402 to select how many explanations in the time series that the user interface 400 will display. In the example of FIG. 4, two explanations are selected to be shown. The drop down menu 402 is a configurable timeline window.

The user interface 400 for explain functionality provides a timeline of search results, feedback and Key performance indicators (KPIs) at each step of the timeline (e.g., timeline at time t and t−1). The user interface 400 can also depict the value of each search feature. For example the user interface 400 shows how TF-IDF, open candidate, job seeker scores and other candidate features contribute to a candidate being recommended. The user interface 400 can also implicitly indicate convergence of intent along the timeline. The user interface 400 can also highlight the contribution of each feedback to the presently shown search result (e.g., the candidate recommended time t).

The user interface 400 shows candidate information 404 for a candidate recommended at time t and candidate information 404 for another candidate recommended at time t−1 (i.e., a previous recommendation, the last candidate). The user interface 400 also shows query information 408 for the candidate recommended at time t and query information 410 for the last candidate recommended at time t−1. As shown, the query information 408 and 410 can include respective intents, skills, pulls, rewards, successes, algorithm scores (UCB scores in the example of FIG. 4), and choice probabilities corresponding to the candidate and the last candidate.

With continued reference to FIG. 4, the user interface 400 also presents other query information 412 for a candidate stream at time t and other query information 414 for other queries in a candidate stream at time t−1. As shown, the other query information 412 and 414 can include respective intents, skills, pulls, rewards, successes, algorithm scores (UCB scores in the example of FIG. 4), and choice probabilities for the candidate streams at different points in time (e.g., times t and t−1). Lastly, the user interface 400 includes charts 416 comparing intents at time t and charts 418 comparing intents at time t−1. In the example of FIG. 4, charts 416 and 418 plot UCB algorithm scores and choice probabilities across different intents at times t and t−1, respectively.

FIG. 5 is a screen capture illustrating a second screen of a user interface 500 for explaining current candidate based searches, in accordance with an example embodiment. The user interface 500 explains a query cluster, e.g., a candidate search query, and shows candidate information such as skills. The user interface 500 can provide a time-series view of the explanations at each step. In particular, the user interface 500 includes a drop down menu 502 to select how many explanations in the time series that the user interface 500 will display. In the example of FIG. 5, two explanations are selected to be shown. The drop down menu 502 is a configurable timeline window.

The user interface 500 for explain functionality provides a timeline of search results, feedback and KPIs at each step of the timeline (e.g., timeline at time t and t−1). The user interface 500 can also depict the value of each search feature (e.g., shows how TF-IDF, open candidate, job seeker scores and other candidate features contribute to a candidate being recommended. The user interface 500 can also implicitly indicate convergence of intent along the timeline. The user interface 500 can also highlight the contribution of each feedback to the presently shown search result (e.g., the candidate recommended time t).

The user interface 500 shows candidate information 504 for a candidate recommended at time t and candidate information 504 for another candidate recommended at time t−1 (i.e., a previous recommendation, the last candidate). The user interface 500 also shows query information 508 for the candidate recommended at time t and query information 510 for the last candidate recommended at time t−1. As shown, the query information 508 and 510 can include respective intents, skills, pulls, rewards, successes, algorithm scores (UCB scores in the example of FIG. 5), and choice probabilities corresponding to the candidate and the last candidate.

With continued reference to FIG. 5, the user interface 500 also presents other query information 512 for a candidate stream at time t and other query information 514 for other queries in a candidate stream at time t−1. As shown, the other query information 512 and 514 can include respective intents, skills, pulls, rewards, successes, algorithm scores (UCB scores in the example of FIG. 5), and choice probabilities for the candidate streams at different points in time (e.g., times t and t−1). Lastly, the user interface 500 includes charts 516 comparing intents at time t and charts 518 comparing intents at time t−1. In the example of FIG. 5, charts 516 and 518 plot UCB algorithm scores and choice probabilities across different intents at times t and t−1, respectively.

By using the user interfaces 400 and 500, a user will be able to ascertain the following information:

(1) Which of an end-user's feedback has an impact on the current result? That is, multiple explanations for different time periods can show impact of feedback.

(2) How much effect did a past judgement have on the current result?

(3) How is the overall stream behaving?

(4) How was the explicit user feedback from suggested candidates acted upon?

Implementation of the explain functionality shown in FIGS. 4 and 5 is idempotent (that is, explanation of why a candidate is recommended at a point at time can be created, explanations can be created on the fly based on stored events). The stored events can be raw events, in order to boost efficiency storage. Embodiments advantageously provide the ability to teach system recruiter preferences for candidates. Given an initial state and the sequence of key performance indicators (KPIs), explain functionality can emit a description for each of the steps in the sequence.

An example framework allows a plug-n-play explain implementation, so that alternate implementations can coexist. Access to this functionality can be controlled by a LiX (system permission issue, like an access control list (ACL), depending on the user role, access to the explanation user interfaces can be controlled).

In some embodiments, performing query clustering populates arms for a MAB approach. According to these embodiments, the MAB approach is a way to explore whether, for a current candidate search, certain queries are more appropriate for the search. To ascertain whether each of these query intent clusters (e.g., skills clusters) will have sufficient recall, an embodiment examines the percentage contribution of each of the clusters. Embodiments explain queries that are built or created using query clustering. As shown, the user interfaces 400 and 500 provide details regarding cluster membership.

In some embodiments, each of the skills in a skills taxonomy can be represented as a categorical variable that is either absent or present in a member's profile. Considering a member profile to be equivalent to a document and skills to be the words in a document, the example methods and systems for query intent clustering can perform LDA for each of the titles and then obtain the resultant topic vectors. The resultant clusters can be similar to those obtained by LCA. In one implementation, the method leverages parallel Spark-based implementation of LDA, using a Spark open source big data processing framework. The systems and methods shown in FIGS. 6-16 can be used to complete offline pipelines for query intent clustering. Also, query clusters, such as, for example, candidate search queries, can be deployed in the recruiting tools, methods, and systems described with reference to FIGS. 6-16.

Figure 6:
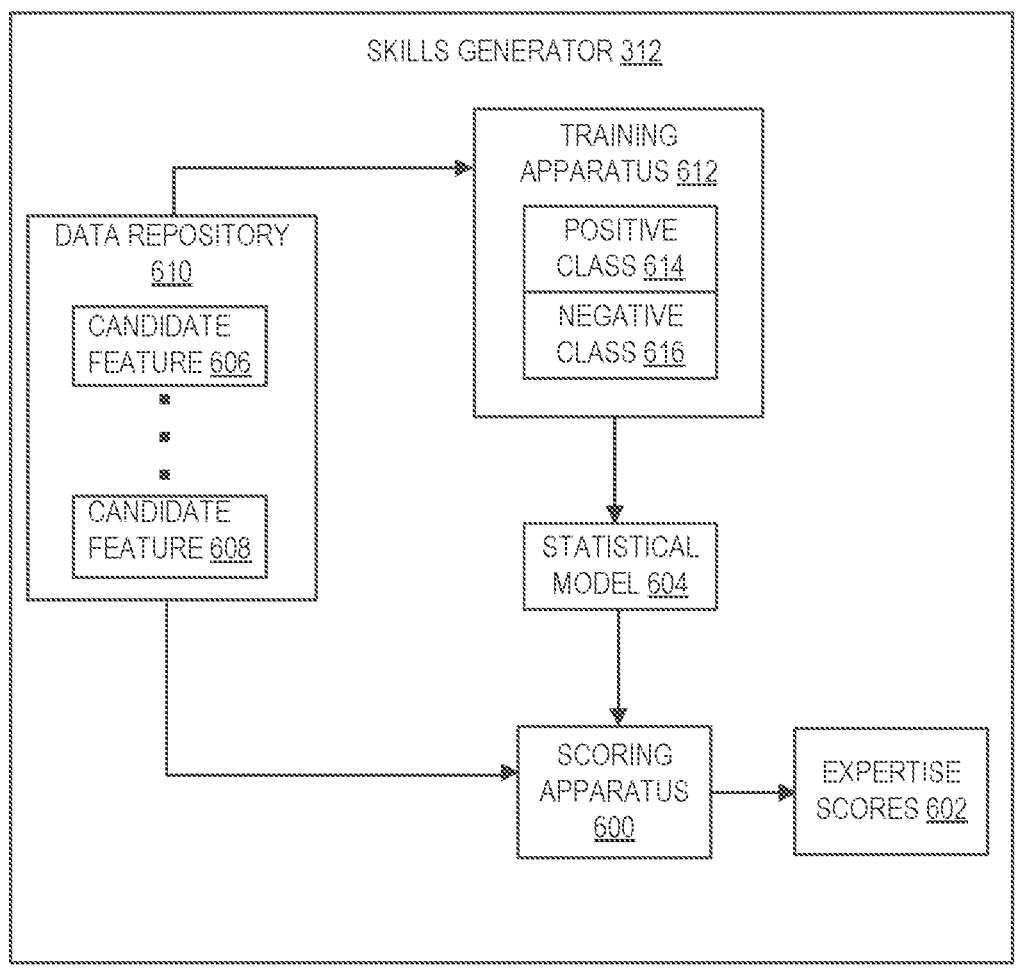
FIG. 6 is a block diagram illustrating a skills generator in more detail, in accordance with an example embodiment.

FIG. 6 is a block diagram illustrating the skills generator 312 in more detail, in accordance with an example embodiment. As shown in FIG. 6, a scoring apparatus 600 may calculate a set of expertise scores 602 using a statistical model 604 and a set of candidate features 606-608 for candidate member profiles. The candidate features 606-608 may be aggregated into a data repository 610 from the member profiles and/or member actions. For example, the candidate features 606-608 may be received from a number of servers and/or data centers associated with websites and/or applications and stored in a relational database for subsequent retrieval and use.

Prior to the scoring apparatus 600 calculating the expertise scores 602 on actual member profiles, a training apparatus 612 may obtain training data for the statistical model 604, which includes a positive class 614 and a negative class 616. The positive class 614 may include data associated with items of a particular category (e.g., trait, attribute, dimension, etc.), while the negative class 616 may include data associated with items that do not belong in the category.

For example, the statistical model 604 may be a logistic regression model that classifies each member profile as either an expert or a non-expert in a corresponding skill. The positive class 614 may thus include a subset of the candidate features 606-608 associated with members with known expertise in one or more skills. Such 'expert' members may be identified based on publications, speeches, awards, and/or contributions of the members in their respective fields. On the other hand, the negative class 616 may include a subset of the candidate features 606-608 associated with members who are not recognized as experts in their respective fields, such as random members who list a given skill in their profiles. Because far fewer members belong in the positive class 614 than the negative class 616, the positive class 614 may be oversampled to produce a roughly class-balanced set of training data for the statistical model 604.

Next, the training apparatus 612 may use the positive class 614 and the negative class 616 to train the statistical model 604. For example, the training apparatus 612 may use maximum-likelihood estimation (MLE) and/or another estimation technique to estimate the parameters of a logistic regression model for calculating the expertise scores 602. After training of the logistic regression model is complete, the parameters may be set so that the logistic regression model outputs values close to 1 for training data in the positive class 614 and values close to 0 for training data in the negative class 616.

The trained statistical model 604 may be provided to the scoring apparatus 600, which calculates the expertise scores 602 for member profiles not included in the training data (such as current candidate member profiles supplied by the searcher) by applying the statistical model 604 to features (e.g., candidate features 606-608) for each of the items. For example, a feature vector may be generated for each item from a subset of the candidate features 606-608 in the data repository 610, and the statistical model 604 may be applied to the feature vector to calculate an expertise score 602 for the item with respect to a dimension of the member profile.

The candidate features 606-608 used in the calculation of the expertise scores 602 may include demographic features, social features, and behavioral features. Demographic features may include data related to a member's location, age, experience, education, and/or background; social features may include features related to the behavior of other members with respect to the member; and behavioral features may include features related to the member's actions or behavior with a social networking service and/or related websites or applications. In some embodiments, the social networking service is an online professional network.

Figure 7:
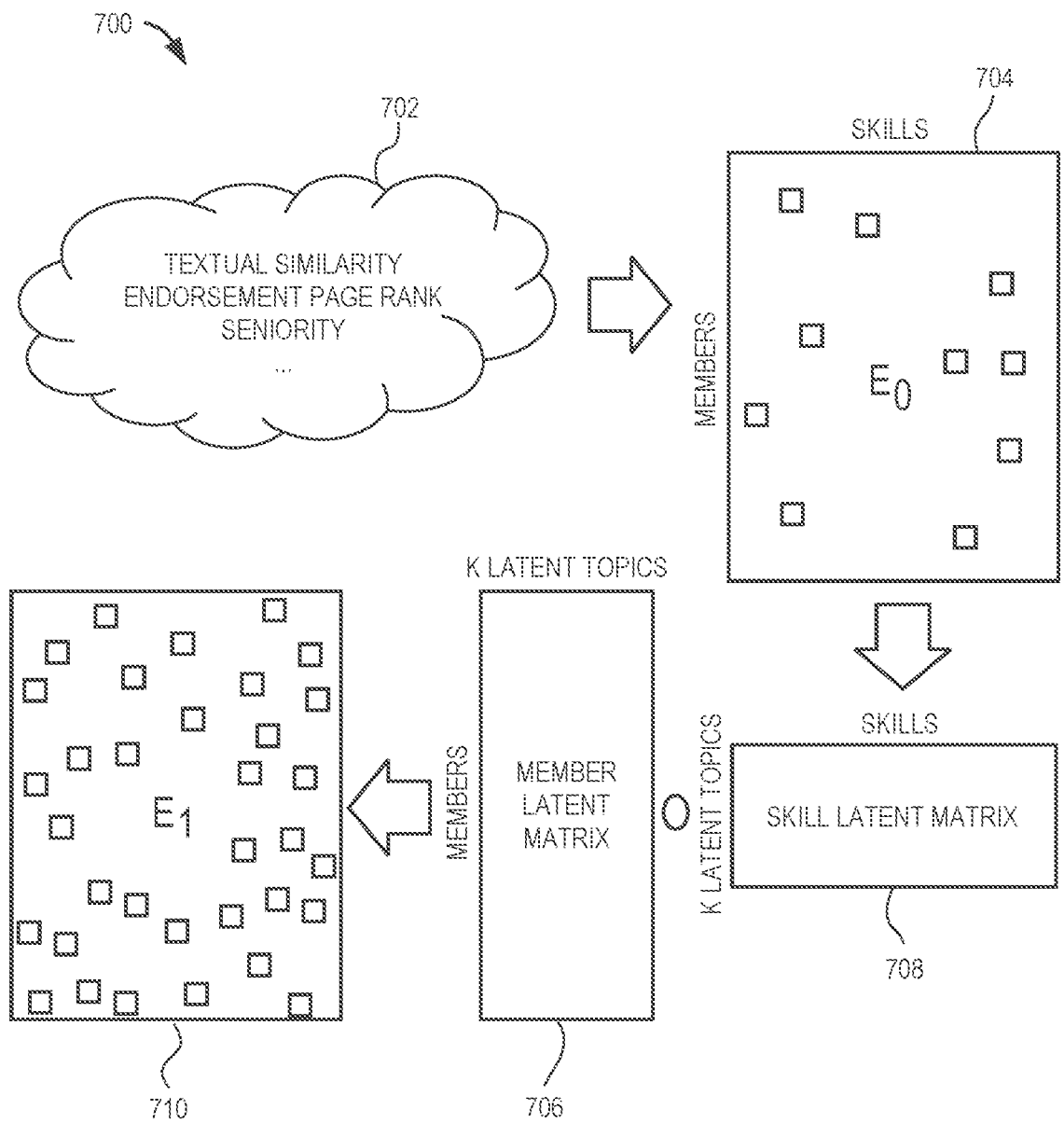
FIG. 7 is a diagram illustrating an offline process to estimate expertise scores, in accordance with another example embodiment.

FIG. 7 is a diagram illustrating an offline process 700 to estimate expertise scores, in accordance with another example embodiment. A supervised machine learning algorithm combines various signals 702, such as skill-endorsement graph page rank, skill-profile textual similarity, member seniority, etc., to estimate the expertise score. After this step, a formed expertise matrix 704 is very sparse since only a small percentage of the pairs can be predicted with any degree of certainty. The formed expertise matrix 704 may be factorized into a member matrix 706 and a skill matrix 708 in K-dimensional latent space. Then, the dot product of the formed expertise matrix 704 and the skill matrix 708 is computed to fill in the 'unknown' cells. The intuition is that the more members list two particular skills in their corresponding member profiles (called co-occurrence of skills); the more likely it is that a member only listing one of those skills also has the other skill as a latent skill. Since the dot product results in a large number of non-zero scores of each member on the skills, the scores can then be thresholded such that if the member's score on a skill is less than a particular threshold, the member is assumed not to know the skill and is assigned a zero expertise score on the skill. Thus, a final expertise matrix 710 is still sparse, but relatively much denser than the formed expertise matrix 704.

Referring back to FIG. 3, given a set of input current candidates, the skills generator 312 can rank the skills for the group of current candidates. Then, the top N ranked skills can be selected to represent the current candidates. Expertise scores of a current candidate on outlier skills are zero or very low, and thus these skills are unlikely to be selected. Moreover, because skills are summed over all candidates, the skills that many candidates have are boosted, thus representing the commonality of the skill set among all current candidates.

Turning now to organizations such as companies, for a particular company, given the current candidate profiles, the query builder 306 can generate a set of other companies, outside of the particular company, that are likely to have candidates similar to the particular company's current candidates in their current candidate profiles. In order to accomplish this, the query builder 306 contains an organization generator 314, which can use collaborative filtering to find organization relationships. The organizations can be companies or other organizations that have been browsed or that candidates have been associated with, such as, for example, corporations, firms, universities, hospitals, government entities, or other organizations. The organizations can be organizations that candidates have worked for or have been under contract to (e.g., as consultants, temporary employees, interns, or contractors). Specifically, an organization browse map using co-viewing relationships (people who view organization or company A and view organization or company B) may be utilized. Intuitively, organizations or companies co-viewed by highly overlapped sets of people are likely to be similar. Thus, activity and/or usage information for searchers/browsers within the social networking service may be retrieved and mined to construct the organization browse map, and this browse map may then be used to find the organization relationships by the organization generator 314. Other information may be used either in conjunction with or in lieu of the organization browse map. For example, the social networking service may keep track of candidates who apply to a given organization or company. Therefore, it may deduce that if a member who applied to organization B also applied to organization A, then organization A and organization B are similar. This similarity relationship may be used as the browse map is used to generate companies or organizations related to companies or organizations identified in profiles of current candidates. Another signal that may be used is organization movement, meaning that if a relatively large number of people who left organization A went to work for organization B, this might imply that organization A and organization B are somewhat similar.

Similar strategies can be used for other facets of a query. For example, title, industry, locations, and schools can all be expanded from those facets in the current candidate profiles by finding similar facets using, for example, browse maps.

Once the query builder 306 completes building the query based on the techniques described above, the query may be submitted to a search engine such as, for example, the query processor 308, to return search results. The search results represent candidates who are similar in some ways to the current candidates that have been selected or hired by the searcher, thus alleviating the searcher of the burden of composing the query. Once the results are returned, a search results ranker 310 may rank the search results according to one or more ranking algorithms. A subset of the top-ranked search results may then be displayed to the searcher using a results display component 316. In an example embodiment, the results display component 316 interacts with the client profile search component 302 to facilitate such a display. The number of top-ranked search results displayed may vary based on, for example, current size of a display window, font size, user preferences, etc. According to some embodiments, the results display component 316 may also cause display of an explanation of the query created by the query builder 306. Example user interfaces for presenting query explanations, such as those created by results display component 316, are provided in FIGS. 4 and 5.

While any ranking algorithms may be used by the search results ranker 310 to rank the search results, in an example embodiment a machine learning algorithm is used to train a ranking model specifically to be used with searches generated by searchers providing current candidates in lieu of text-based keywords. Given the significant difference between a search by current candidates and a traditional query-based search, this algorithm helps provide rankings that accommodate this new type of search.

Figure 8:
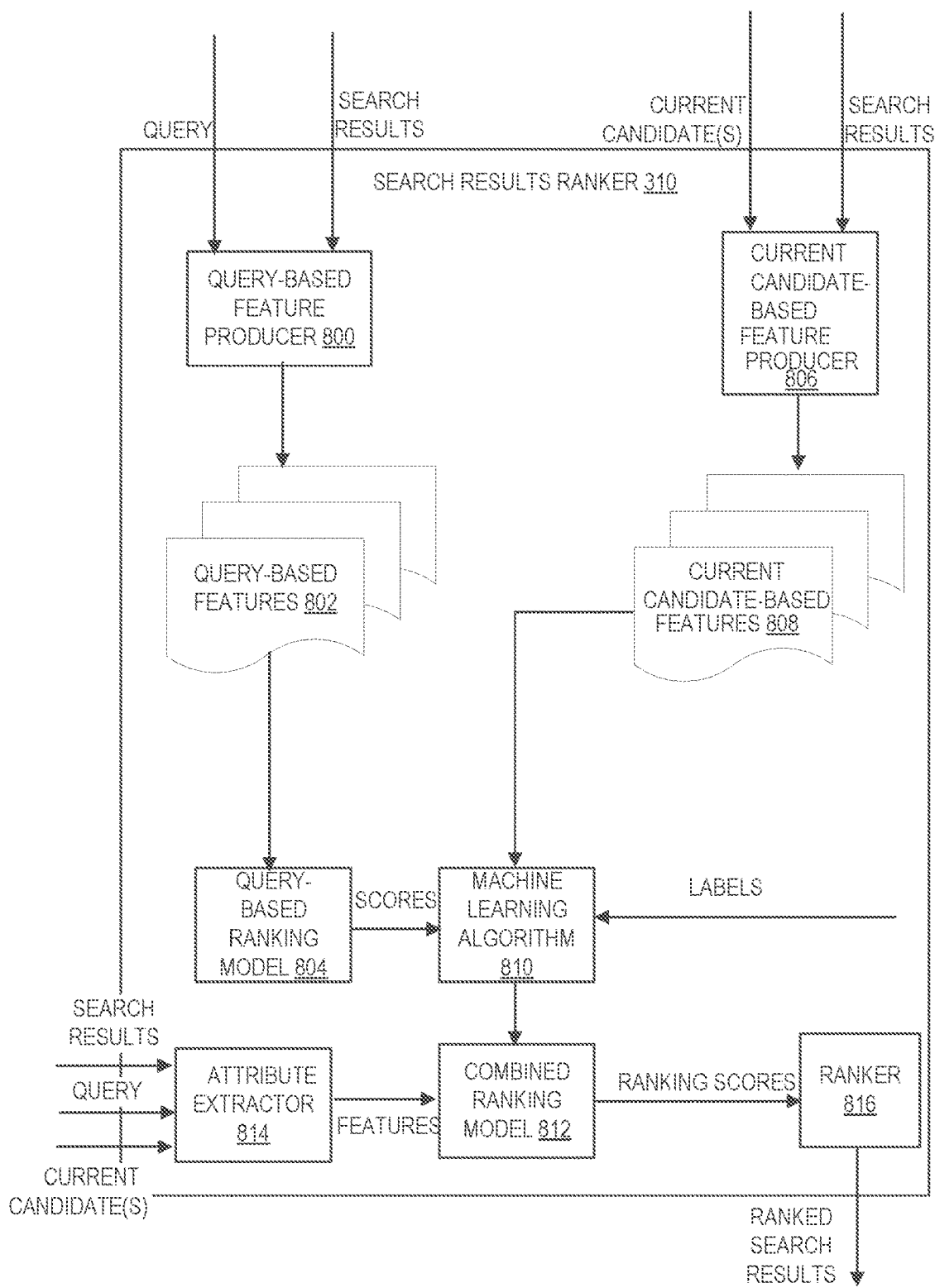
FIG. 8 is a block diagram illustrating a candidate search results ranker in more detail, in accordance with an example embodiment.

FIG. 8 is a block diagram illustrating the search results ranker 310 in more detail, in accordance with an example embodiment. The search query that produced the search results, as well as the search results, may be fed to a query-based feature producer 800, which produces a set of query-based features 802 of the results. The query-based features 802 include search engine features such as term frequency-inverse document frequency (TF-IDF), term location in document, bag-of-words, etc. These query-based features 802 may be fed to a query-based ranking model 804, which returns scores for each of the query/result pairs.

Separately, a current candidate-based feature producer 806 receives as input the specified current candidate(s) and the search results from the query generated by the current candidate(s). The current candidate-based feature producer 806 then produces a set of current candidate-based features 808 of the results. The current candidate-based features 808 include features that are based on a comparison of current candidates and the search results, with each feature measuring one current candidate/search result pair. Example current candidate-based features include similar career path, skill similarity, headline matching, headline similarity, and browse map similarity.

Similar career path is a measure of a trajectory similarity between the positions held by the current candidate and the search result. Thus, for example, if the current candidate started as an intern, was promoted to a staff engineer, and then was promoted to project manager, a search result having a similar progression of the trajectory of their career path would rank higher in this feature than, for example, a search result who started off at the top (e.g., as a project manager). To capture the trajectory information, each member profile may be modeled as a sequence of nodes, each of which records all information within a particular position of a member's career, such as company, organization, title, industry, time duration, and keyword summary.

At the node (position) level, similarity can then be ascertained by using a generalized linear model, although in other embodiments other approaches could be substituted. Then, at the sequence (profile) level, a sequence alignment method may be employed to find an optimal or near-optimal alignment between pairs of nodes from the two career paths.

Various schemes may be used to model the node corresponding to a job position, including sequence of positions and sequence of compositions. In the sequence of positions scheme, each node represents one particular position of the member's professional experience. In the sequence of compositions scheme, for each node, in addition to position information, transition information is also incorporated between the given position and the previous one. In other words, the position information, along with transition-related information, together comprise the node. Transition information, such as whether the member's title changes in this transition, whether the company or organization changes, how the seniority changes, and the time spent in this transition, enhances the representation of this scheme by further disclosing information about the changing trend between a previous and a given position.

When evaluating the similarity between two career paths, each node is a representation of one particular work experience. In order to compute the overall similarity between two career sequences, the score for the query/result pair can be decomposed into the sum of the similarities between several respective pairs of aligned nodes from the two sequences. A sequence alignment algorithm can be used to measure the sequence level similarity by calculating the sum of the optimal alignments of node pairs. The two sequences can be aligned incrementally. The sequence alignment scheme can be formulated as a dynamic programming procedure.

A similarity model may be learned at the node level by using, for example, a logistic regression model. Features relevant to this model may include, for example, current title, current company, current company size, current industry, current functions, job seniority, current position summary, title similarity, company similarity, industry similarity, duration difference between positions, whether two transitions were within the same company, whether two transitions were in the same industry, whether seniority changed, whether the title changed, and duration of time between the two transitions.

Skill similarity is a measure of similarity of the skill set of the current candidate and the skill set of the search result. It should be noted that skill sets may include skills that are explicit (e.g., specified by the member in their member profile) or implicit (e.g., skills that are similar to skills specified by the member in their member profile, but not explicitly listed).

Headline matching is a measure of the similarity between the query and the headline of each result. Notably, this is based on a text-based comparison, and is not strictly current candidate-based. In an embodiment where the current candidate-based feature producer 806 accesses the query, these comparisons can be made by the current candidate-based feature producer 806. A headline is one or more visible fields (along with names) displayed as a search result snippet for a search result. Such snippets often include a headline that helps explain why the result is relevant and likely to trigger actions from the searcher. The headline-matching feature, therefore, measures the similarity between the query and this headline from the search result's snippet.

Headline similarity is a measure of the similarity between a headline of the current candidate and the headline of the search result. This similarity calculation may be performed with or without considering word semantics. In example embodiments where word semantics are not considered, a word2vec algorithm may be utilized. Word2vec is a group of related models used to produce word-embedding. The word-embeddings are shallow, two-layer neural networks that are trained to reconstruct linguistic contexts of words. The neural network is shown a word and guesses which words occurred in adjacent position in an input text. After training, word2vec models can be used to map each word to a vector of typically several hundred elements, which represent that word's relation to other words.

Browsemap similarity is a measure of whether and how much other members/searchers/browsers visited both the current candidate's profile and the search result's profile in the same browsing session. The intuition is that if previous members/searchers/browsers viewed both profiles in the same session, then there is a higher likelihood that the profiles are similar, and thus that the underlying current candidate and search result are similar.

The current candidate-based features 808 may be fed along with the scores from the query-based ranking model 804 to a machine learning algorithm 810. The machine learning algorithm 810 is designed to train a combined ranking model 812 that is capable of determining a ranking score for a search result at runtime. This training may use labels supplied for training data (e.g., training current candidates and training search results along with labeled scores for each). The training may involve the machine learning algorithm 810 learning which features/scores are more or less relevant to the ranking scores, and appropriately weighting such features and scores for runtime computations. At runtime, an attribute extractor 814 extracts both query-based and current candidate-based features from the query, search results, and current candidates, and feeds these features to the combined ranking model 812, which produces the scores as per its model. A ranker 816 then uses these ranking scores to rank the search results for display to the searcher.

It should be noted that since searching by current candidates is a new concept, it is difficult to generate labeled data directly from a log of previous search systems, as would typically be done to generate labeled data. Instead, in an example embodiment, labeled data is generated from the log of a query-based search. One such log is a log of electronic communications performed after the search. For example, if a searcher sees 20 results to a query-based search for candidates, and sends email communications to 8 candidates from the 20 results, then it may be assumed that these 8 candidates are similar enough to be considered for the same job, and thus if a profile for one or more of those 8 candidates had been submitted for a search by current candidate, the other candidates could be considered likely top results. In an example embodiment, other actions taken with respect to previous search results may be logged and similarly used to determine current candidate matches. For example, while communication with a candidate may be considered as strongly indicative of a match for the underlying position (and thus a match with other candidates also emailed for the same position) and assigned a high relevance score, clicking on a candidate (without an email) may be considered to be a partial match and may be assigned a moderate relevance score, while skipped results might be considered a low relevance score. The relevance scores may be used as the labels for the sample data.

Thus, in an example embodiment, communications between searchers and members of the social network service are monitored and logged, and these communications are used to derive a label score for each sample search result/current candidate pair. (The sample search results may simply be the search results presented in response to previous queries.) The label score may be generated using various combinations of the metrics described above. For example, if the same searcher communicated with both candidates A and B in response to the same search query, then candidate B is assigned a score of 5 (on a scale of 1 to 5, 5 being most relevant) for a current candidate A and candidate A is assigned a score of 5 for a current candidate B. Actions such as clicking on a candidate that indicate a moderate relevance may be assigned a score of 3, and taking no action may be assigned a score of 1. Scores for various log entries can then be combined and averaged. The result is profile pairs that have been assigned scores of between 1 and 5 based on previous actions or inactions by previous searchers. These label scores may then be used as labels for hypothetical current candidate/search result pairs for those same member profiles.

In an example embodiment, a dynamic weight trainer is introduced into the architecture of FIG. 8 in order to dynamically alter the weights assigned to the current candidate-based features 808. Specifically, a search query need not be limited to a single query before the search is complete. Often the searcher may interact with the original query and search results to provide additional refinements of the original search. This is not only true with traditional text-based searches but also can be true with current candidate-based searches as well. This may be accomplished by the searcher applying additional filters or making text-based additions to the initial current candidate-based search to refine the results. The result is that the current candidate-based features, which directly measure the similarity between the current candidate(s) and the search results, become less and less important as the search is refined.

At the same time, as the search session continues, the confidence of the remaining attributes (e.g., query-based attributes) increases in usefulness.

Figure 9:
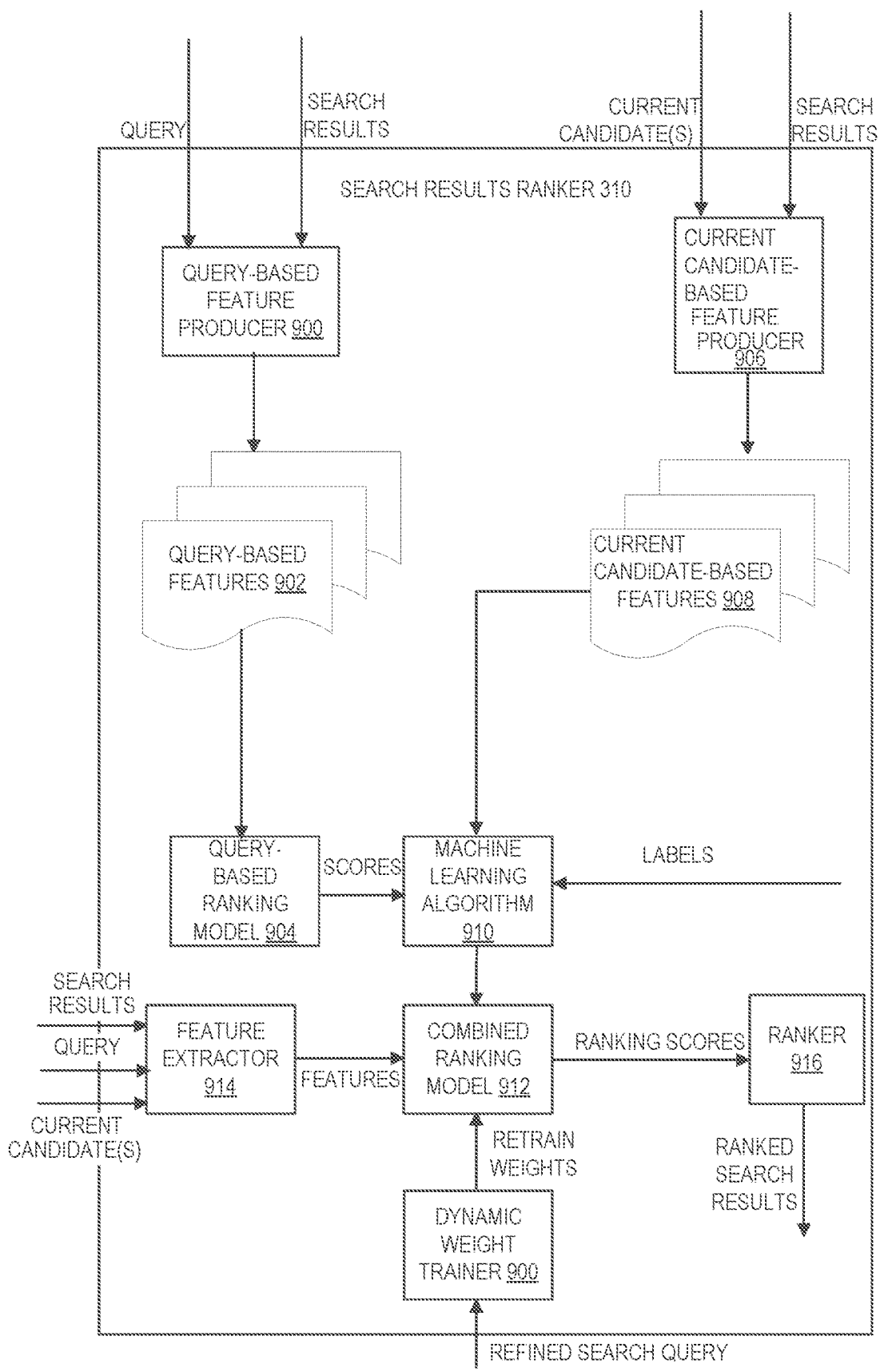
FIG. 9 is a block diagram illustrating a search results ranker in more detail, in accordance with another example embodiment.

FIG. 9 is a block diagram illustrating the search results ranker 310 in more detail, in accordance with another example embodiment. FIG. 9 is identical to FIG. 8 with the exception of the addition of a dynamic weight trainer 900. The purpose of the dynamic weight trainer 900 is to dynamically alter the weights of the features extracted to favor the query-based features 802 over the current candidate-based features 808 over time. This may be performed by applying a decay function, defined on some measure of session length, such as the number of query refinements, to gradually reduce the weights of the current candidate-based features 808 and/or increase the weights of the query-based features 802. This function controls the dynamic balance between the impacts of the input current candidates and the query on the result ranking.

Figure 10:
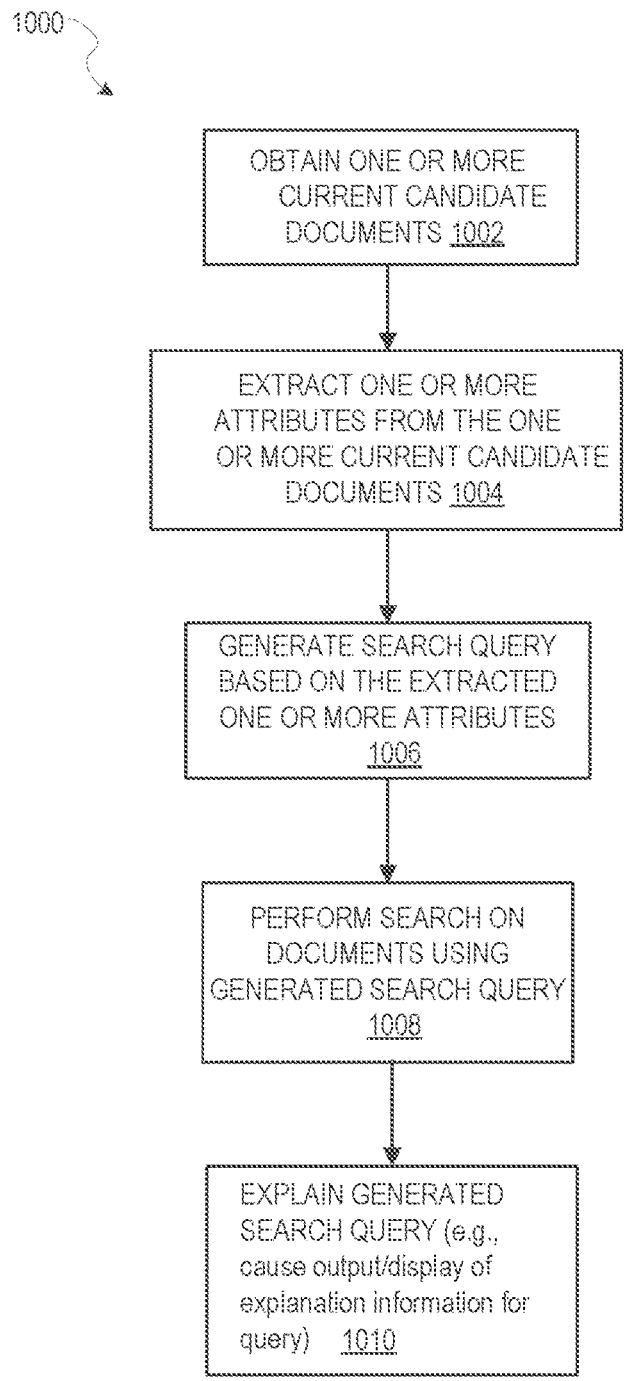
FIG. 10 is a flow diagram illustrating a method for performing a current candidate based search in accordance with an example embodiment.

FIG. 10 is a flow diagram illustrating a method 1000 for performing a current candidate-based search in accordance with an example embodiment. At operation 1002, one or more current candidate documents may be obtained. In an example embodiment, these documents are member profiles in a social networking service. As shown, operation 1002 can include obtaining profiles of current candidates for a given title and synonyms of the title. Such profiles can be automatically identified based on a particular title supplied by the searcher, and that title's synonyms. In an alternative or additional embodiment, the profiles can be obtained by a searcher specifying the corresponding members and the member profiles being retrieved from a database based on the searcher's specified members. However, implementations are possible where the documents obtained are not member profiles.

At operation 1004, one or more attributes are extracted from the one or more current candidate documents. Operation 1004 can use the extracted attributes to determine query intent clusters. According some embodiments, the query intent clusters may include skills clusters. For instance, in some embodiments, operation 1004 can include extracting skills from current candidate documents. According to such embodiments, operation 1004 can include mapping the extracted skills to skill identifiers (skill IDs).

At operation 1006, a search query is generated based on the identified query intent clusters (e.g., skills clusters). As shown, operation 1008 can comprise completing an offline pipeline for query intent clustering.

At operation 1008, a search can be performed on documents using the generated search query, returning one or more result documents. As with the current candidate documents, the result documents may also be member profiles in a social networking service.

At operation 1010, a search query is explained. The query can be based on the identified query intent clusters (e.g., skills clusters). As shown, operation 1010 can include displaying query explanation information. The query can be a query built using query intent clustering. In an optional additional operation, an interface such as the example interface shown in FIGS. 4 and 5, can provide query information for the search performed at operation 1008 on documents using the generated search query, and explain how one or more result documents were returned at different points in time.

Figure 11:
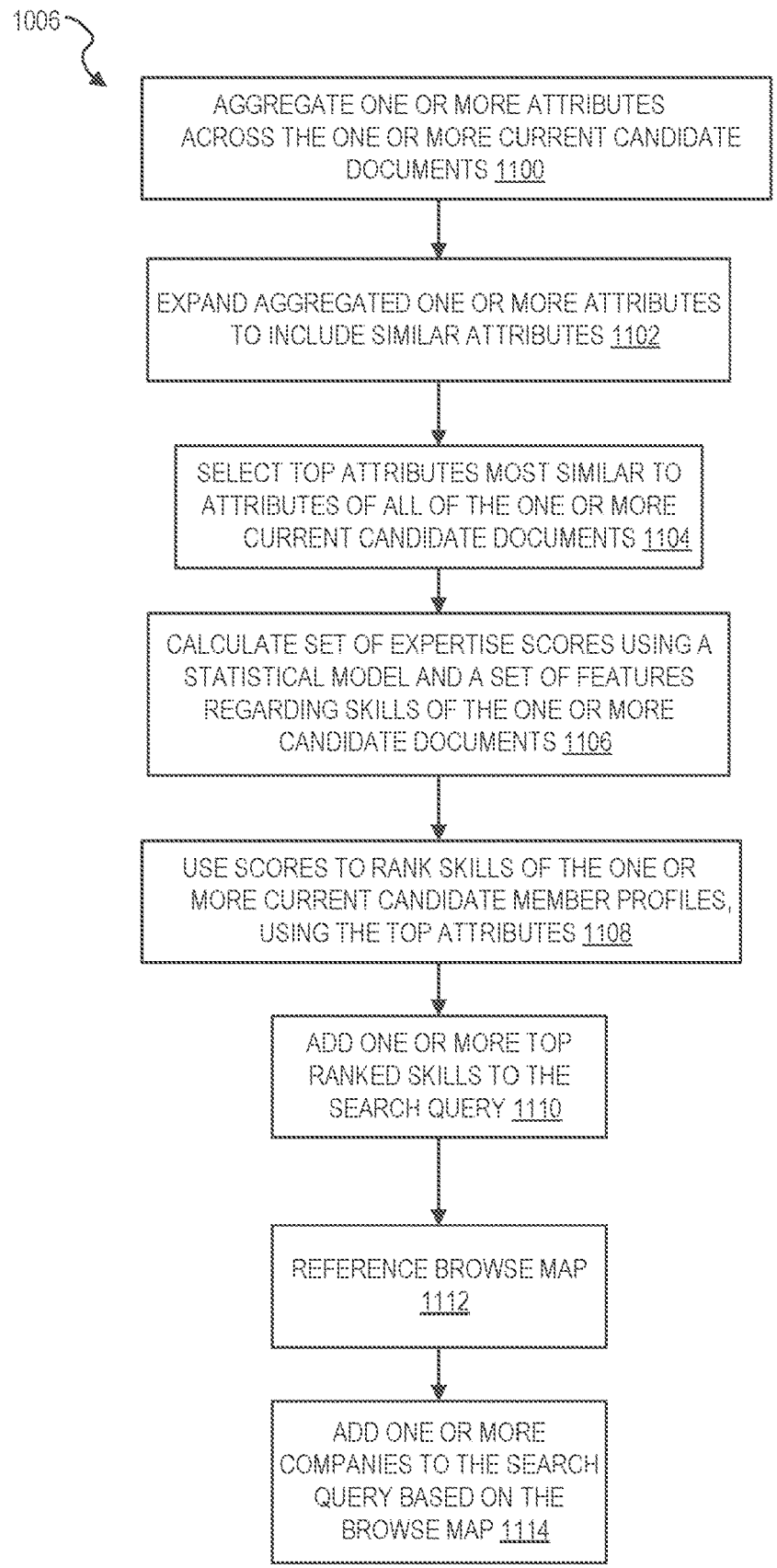
FIG. 11 is a flow diagram illustrating generating a search query based on one or more extracted attributes, in accordance with an example embodiment.

FIG. 11 is a flow diagram illustrating a method of generating a search query based on one or more extracted attributes, in accordance with an example embodiment. FIG. 11 corresponds to operation 1006 of FIG. 10 in more detail. At operation 1100, the one or more attributes are aggregated across the one or more current candidate documents. At operation 1102, the aggregated one or more attributes are expanded to include similar attributes. At operation 1104, top attributes most similar to attributes of all of the one or more current candidate documents are selected. At operation 1106, a set of expertise scores are calculated using a statistical model and a set of features regarding skills of the one or more current candidate documents. The statistical model may be a logistic regression model trained using a machine learning algorithm. At operation 1108, the expertise scores are used to rank skills of the one or more current candidate documents, using the top attributes. At operation 1110, one or more top-ranked skills are added to the search query.

At operation 1112, a browse map is referenced. At operation 1114, one or more companies are added to the search query, the companies being ones that have been co-viewed during the same browsing session as a company identified in one or more of the current candidate documents, by using the browse map.

Figure 12:
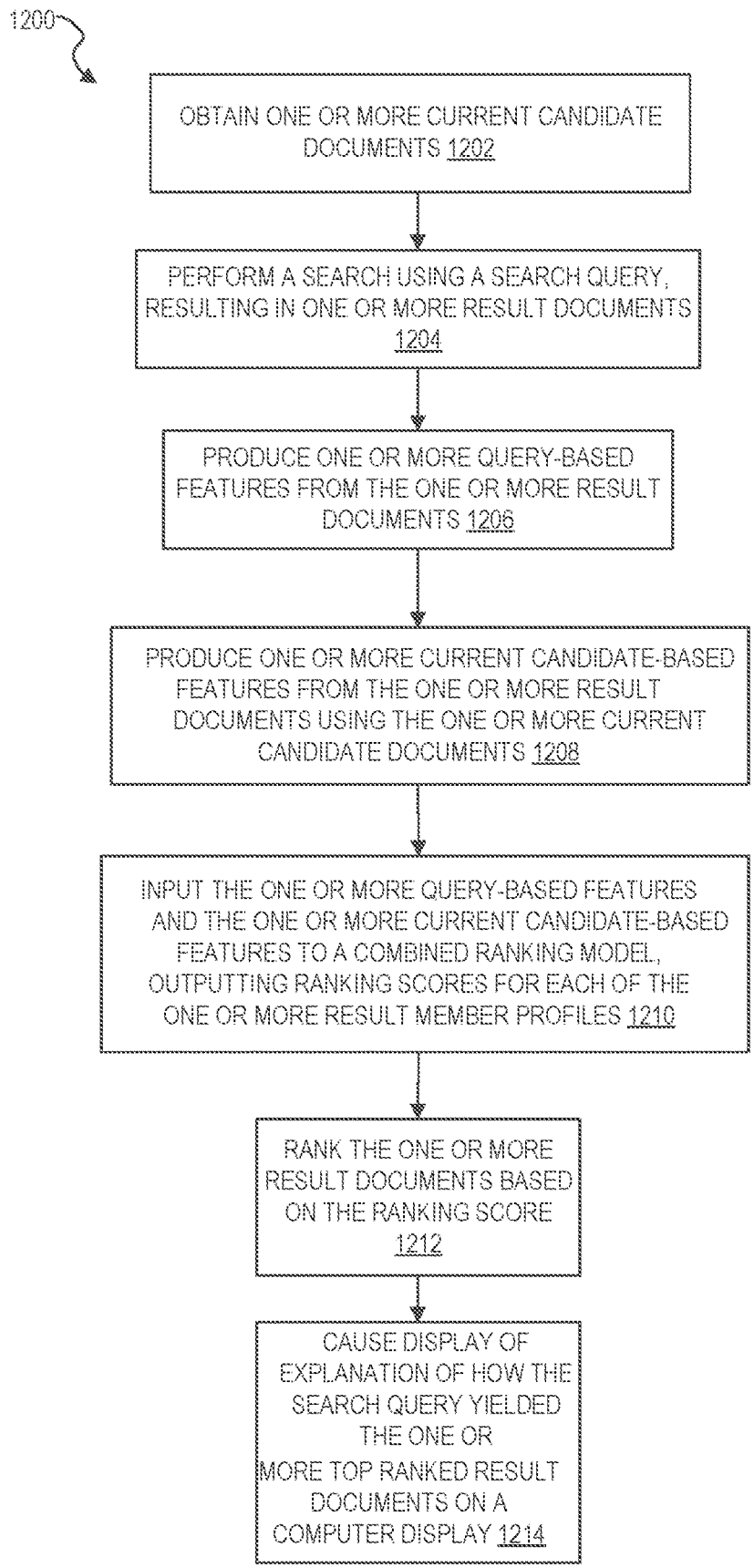
FIG. 12 is a flow diagram illustrating a method of ranking search results using current candidates, in accordance with an example embodiment.

FIG. 12 is a flow diagram illustrating a method 1200 of ranking search results using current candidates in accordance with an example embodiment. At operation 1202, one or more current candidate documents may be obtained. In an example embodiment, these documents are member profiles in a social networking service and they are obtained by a searcher specifying the corresponding members and the member profiles being retrieved from a database based on the searcher's specified members. However, implementations are possible where the documents obtained are not member profiles.

At operation 1204, a search is performed using a search query, resulting in one or more result documents. Like the current candidate documents, the result documents may be member profiles in an example embodiment. In one example embodiment, operation 1204 can be performed using some of the operations described above with respect to FIGS. 13 and 14.

At operation 1206, one or more query-based features are produced from the one or more result documents using the search query. As described above, this may include features such as TF-IDF.

At operation 1208, one or more current candidate-based features may be produced from the one or more result documents using the one or more current candidate documents. As described above, the current candidate-based features may include similar career path, skill similarity, headline matching, headline similarity, and/or browsemap similarity.

At operation 1210, the one or more query-based features and the one or more current candidate-based features are input to a combined ranking model, outputting ranking scores for each of the one or more result member profiles. The combined ranking model may be trained using similar query-based and current candidate-based features from sample result documents as well as sample search queries and labels.

At operation 1212, the one or more result documents are ranked based on the ranking scores. At operation 1214, display of how the search query yielded the one or more top-ranked result documents on a display device is caused. In certain embodiments, operation 1214 can include causing display of the explanation of how the query resulted in recommending the one or more top-ranked result documents on a computer display, such as, for example, a display screen of a laptop computer, a mobile device (e.g., a smartphone), or a desktop computer.

At operation 1214, a search query is explained. The query can be based on identified query intent clusters (e.g., skills clusters). Operation 1214 can include displaying query explanation information. The query can be a query built using query intent clustering. In an optional additional operation, a user interface such as the example user interfaces shown in FIGS. 4 and 5, can provide query information for the ranking performed at operation 1212 on the result documents using a generated search query, and explain how one or more result documents were returned at different points in time.

Figure 13:
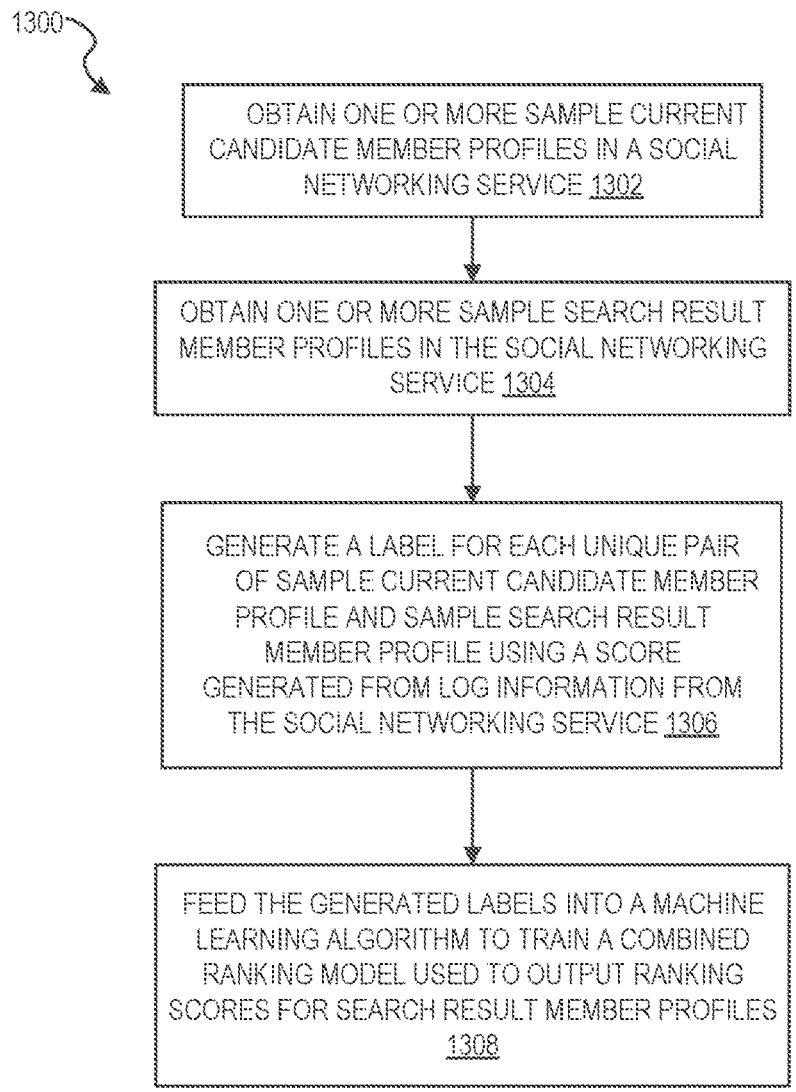
FIG. 13 is a flow diagram illustrating a method for generating labels for sample current candidate member profiles in accordance with an example embodiment.

FIG. 13 is a flow diagram illustrating a method 1300 for generating labels for sample current candidate member profiles, in accordance with an example embodiment. At operation 1302, one or more sample current candidate member profiles in a social networking service are obtained. At operation 1304, one or more sample search result member profiles in the social networking service are obtained. At operation 1306, for each unique pair of a sample current candidate member profile and a sample search result member profile, a label is generated using a score generated from log information of the social networking service. The log information includes records of communications between a searcher and members of the social networking service, the score being higher if the searcher communicated with both the member corresponding to the sample current candidate member profile and the member corresponding to the sample search result member profile in a same search session.

The log information may further include records of user input by the searcher, the user input causing interaction with member profiles in the social networking service but not resulting in communications between the searcher and the members of the social networking service corresponding to both the sample current candidate member profile and the sample search result member profile in the same search session. An example would include the searcher clicking on member profiles and viewing the member profiles but not emailing the corresponding members. A search session may be defined in a number of different ways. In one example embodiment, a search session is the same as a browsing session (e.g., as long as the searcher is logged in to the social networking service). In another example embodiment, the search session is limited to a period of time between a searcher initiating a search and the searcher submitting an unrelated search or logging off the social networking service.

At operation 1308, the generated labels are fed into a machine learning algorithm to train a combined ranking model used to output ranking scores for search result member profiles.

Figure 14:
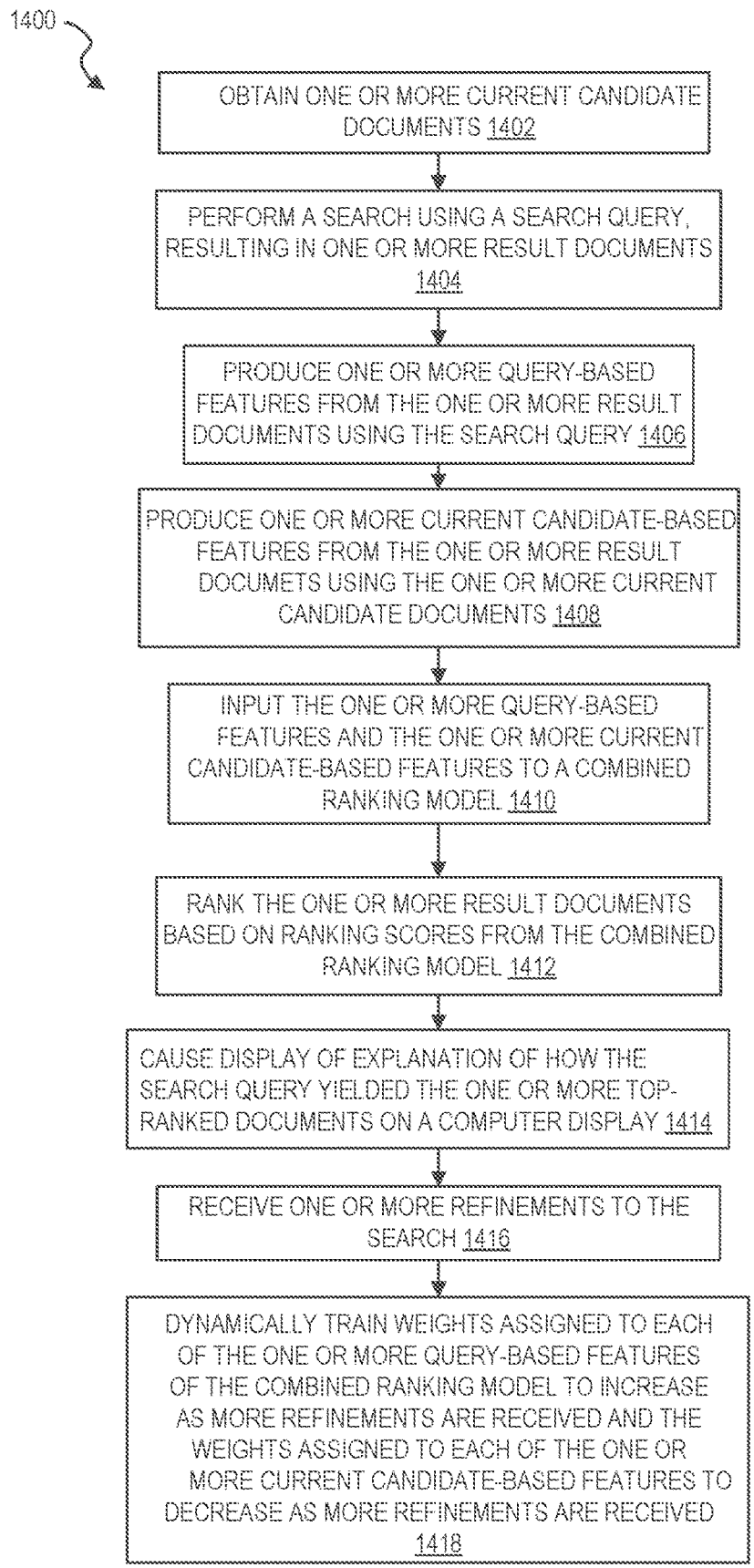
FIG. 14 is a flow diagram illustrating a method of dynamically training weights of a machine learning algorithm model in accordance with an example embodiment.

FIG. 14 is a flow diagram illustrating a method 1400 of dynamically training weights of a machine learning algorithm model in accordance with an example embodiment. At operation 1402, one or more current candidate documents are obtained. At operation 1404, a search is performed using a search query, returning one or more result documents. This search query may or may not have been generated using the one or more current candidate documents.

At operation 1406, one or more query-based features are produced from the one or more result documents using the search query. At operation 1408, one or more current candidate-based features are produced from the one or more result documents using the one or more current candidate documents. At operation 1410, the one or more query-based features and the one or more current candidate-based features are input to a combined ranking model. The combined ranking model is trained by a machine learning algorithm to output a ranking score for each of the one or more result documents. The combined ranking model includes weights assigned to each of the one or more query-based features and each of the one or more current candidate-based features.

At operation 1412, the one or more result documents are ranked based on the ranking scores. At operation 1414, display of how the search query yielded the one or more top-ranked result documents on a display device is caused. In certain embodiments, operation 1414 can include causing display of the explanation of how the query resulted in recommending the one or more top-ranked result documents on a computer display, such as, for example, a display screen of a laptop computer, a mobile device (e.g., a smartphone), or a desktop computer.

At operation 1414, a search query is explained. The query can be based on identified query intent clusters (e.g., skills clusters). Operation 1414 can include displaying query explanation information. The query can be a query built using query intent clustering. In an optional additional operation, a user interface such as the example user interfaces shown in FIGS. 4 and 5, can provide query information for the ranking performed at operation 1412 on the result documents using a generated search query, and explain how one or more result documents were returned at different points in time.

At operation 1416, one or more refinements to the search are received. At operation 1418, the weights assigned to each of the one or more query-based features are dynamically trained to increase as more refinements are received, and the weights assigned to each of the one or more current candidate-based features are dynamically trained to decrease as more refinements are received. This dynamic training may utilize a decay function based on, for example, time or number of refinements.

Blocks, Components, and Logic

Certain embodiments are described herein as including logic or a number of blocks, components, modules, or mechanisms. Blocks may constitute machine components implemented as a combination of software modules (e.g., code embodied on a machine-readable medium) and hardware modules. A 'hardware module' is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The blocks, modules, methods, applications, and user interfaces described in conjunction with FIGS. 1-14 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the internet of things (IoT), while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 15:
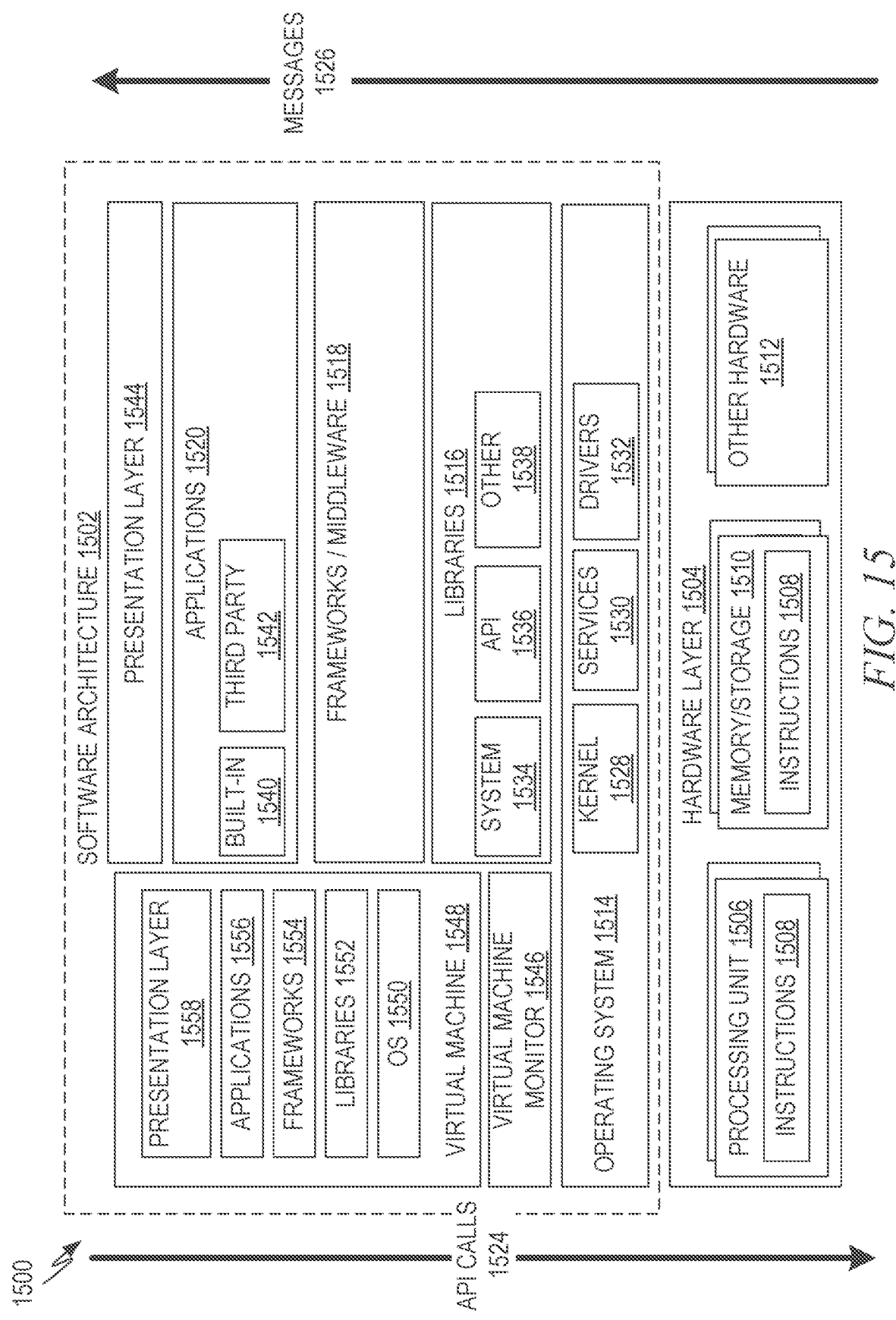
FIG. 15 is a block diagram illustrating a representative software architecture, which may be used in conjunction with various hardware architectures herein described.

FIG. 15 is a block diagram 1500 illustrating a representative software architecture 1502, which may be used in conjunction with various hardware architectures herein described. FIG. 15 is merely a non-limiting example of a software architecture, and it will be appreciated that many other architectures may be implemented to facilitate the functionality described herein. The software architecture 1502 may be executing on hardware such as a machine 1600 of FIG. 16 that includes, among other things, processors 1610, memory/storage 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. The executable instructions 1508 represent the executable instructions of the software architecture 1502, including implementation of the methods, modules, user interfaces, and so forth of FIGS. 1-14. The hardware layer 1504 also includes memory and/or storage modules 1510, which also have the executable instructions 1508. The hardware layer 1504 may also comprise other hardware 1512, which represents any other hardware of the hardware layer 1504, such as the other hardware illustrated as part of the machine 1600.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520, and a presentation layer 1544. Operationally, the applications 1520 and/or other components within the layers may invoke API calls 1524 through the software stack and receive responses, returned values, and so forth, illustrated as messages 1526, in response to the API calls 1524. The layers illustrated are representative in nature and not all software architectures have all layers. For example, some mobile or special-purpose operating systems may not provide a layer of frameworks/middleware 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, and/or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a contacts application, a browser application, a book reader application, a location application, a media application, a messaging application, and/or a game application. The third-party applications 1542 may include any of the built-in applications 1540 as well as a broad assortment of other applications. In a specific example, the third-party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1542 may invoke the API calls 1524 provided by the mobile operating system such as the operating system 1514 to facilitate functionality described herein.

The applications 1520 may utilize built-in operating system 1514 functions (e.g., kernel 1528, services 1530, and/or drivers 1532), libraries 1516 (e.g., system libraries 1534, API libraries 1536, and other libraries 1538), and frameworks/middleware 1518 to create user interfaces to interact with users of the system. Alternatively, or additionally, in some systems, interactions with a user may occur through a presentation layer, such as the presentation layer 1544. In these systems, the application/module 'logic' can be separated from the aspects of the application/module that interact with a user.

Figure 16:
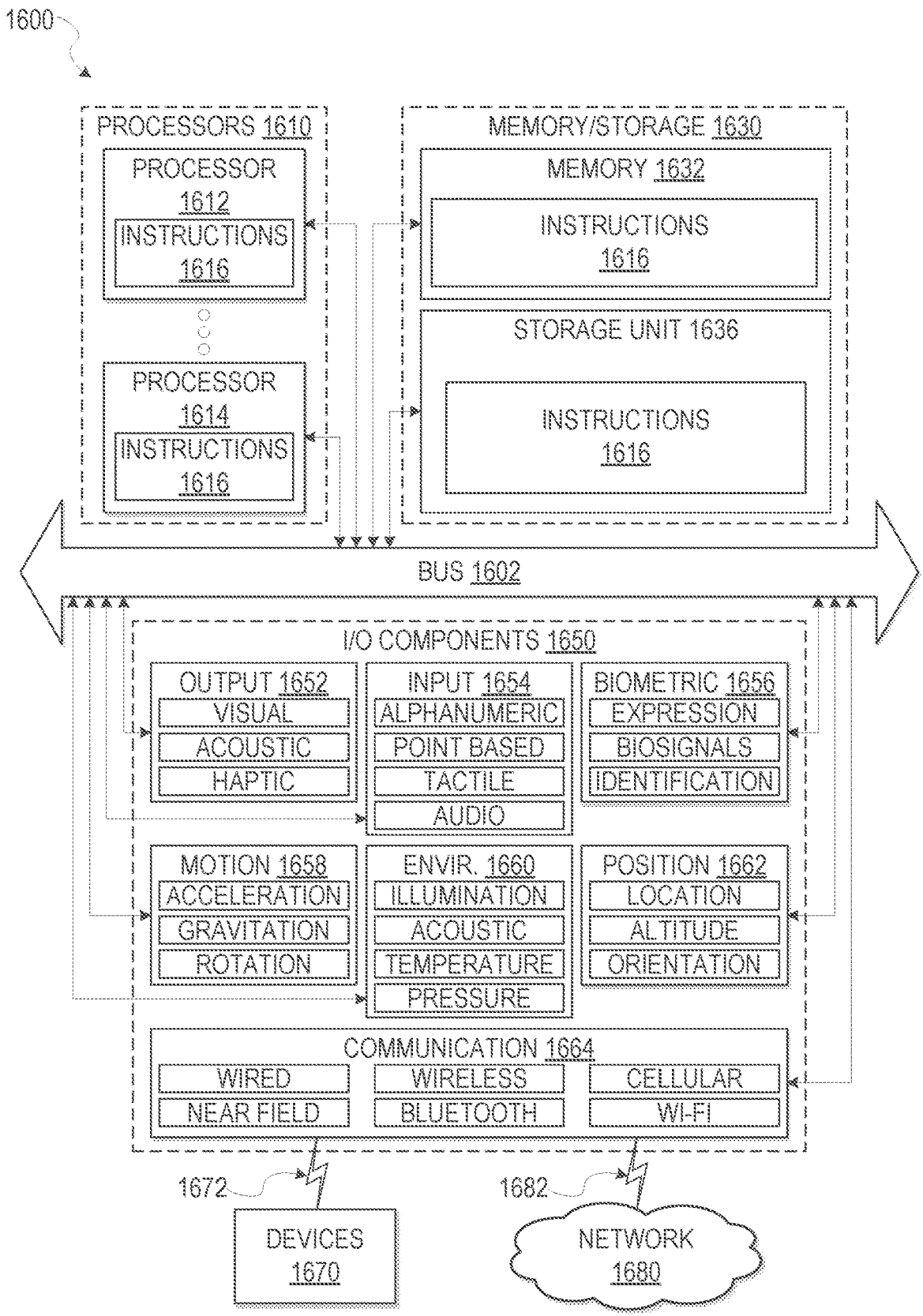
FIG. 16 is a block diagram illustrating components of a machine, according to some example embodiments, able to read instructions from a machine-readable medium (e.g., a machine-readable storage medium) and perform any one or more of the methodologies discussed herein.

Some software architectures utilize virtual machines. In the example of FIG. 15, this is illustrated by a virtual machine 1548. A virtual machine creates a software environment where applications/modules can execute as if they were executing on a hardware machine (such as the machine 1600 of FIG. 16, for example). A virtual machine is hosted by a host operating system (e.g., operating system 1514 in FIG. 15) and typically, although not always, has a virtual machine monitor 1546, which manages the operation of the virtual machine 1548 as well as the interface with the host operating system (e.g., operating system 1514). A software architecture executes within the virtual machine 1548, such as an operating system 1550, libraries 1552, frameworks/middleware 1554, applications 1556, and/or a presentation layer 1558. These layers of software architecture executing within the virtual machine 1548 can be the same as corresponding layers previously described or may be different.
Example Architecture and Machine-Readable Medium FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. The instructions 1616 transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term 'machine' shall also be taken to include a collection of machines 1600 that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1612 and a processor 1614 that may execute the instructions 1616. The term 'processor' is intended to include multi-core processors that may comprise two or more independent processors (sometimes referred to as 'cores') that may execute instructions contemporaneously. Although FIG. 16 shows multiple processors 1610, the machine 1600 may include a single processor with a single core, a single processor with multiple cores (e.g., a multi-core processor), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of the processors 1610 are examples of machine-readable media.

As used herein, 'machine-readable medium' means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term 'machine-readable medium' should be taken to include a single medium or multiple media (e.g., a centralized or distributed database, or associated caches and servers) able to store the instructions 1616. The term 'machine-readable medium' shall also be taken to include any medium, or combination of multiple media, that is capable of storing instructions (e.g., instructions 1616) for execution by a machine (e.g., machine 1600), such that the instructions, when executed by one or more processors of the machine (e.g., processors 1610), cause the machine to perform any one or more of the methodologies described herein. Accordingly, a 'machine-readable medium' refers to a single storage apparatus or device, as well as 'cloud-based' storage systems or storage networks that include multiple storage apparatus or devices. The term 'machine-readable medium' excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654.

The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth.

The environmental components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., HTTP). Similarly, the instructions 1616 may be transmitted or received using a transmission medium via the coupling 1672 (e.g., a peer-to-peer coupling) to the devices 1670. The term 'transmission medium' shall be taken to include any intangible medium that is capable of storing, encoding, or carrying the instructions 1616 for execution by the machine 1600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term 'invention' merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term 'or' may be construed in either an inclusive or an exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system, comprising:
   one or more processors; and
   a non-transitory computer readable storage medium storing instructions that when executed by the one or more processors cause the computer system to perform operations comprising:
   obtaining training data;
   dividing the training data into a positive class and a negative class, wherein the positive class includes data associated with items of a particular category and the negative class includes data associated with items not of the particular category;
   sampling the training data by oversampling the positive class with respect negative class;
   using the sampled training data to train a machine learned model using a machine learning algorithms, the training assigning weights to one or more query-based features;
   obtaining one or more current candidate member profiles used as a basis for a search on member profiles in an online system having a plurality of members;
   extracting one or more attributes from the one or more current candidate member profiles;
   identifying a plurality of query intent clusters based on the extracted one or more attributes;
   selecting one of the plurality of identified query intent clusters based on one or more criteria evaluated for the plurality of identified query intent clusters;
   generating a search query based on the selected one of the one or more identified query intent clusters;
   causing a search to be performed based on the search query, returning a recommended member profile;
   receiving one or more refinements of the search query; and
   retraining the machine learned model based on the one or more refinements, altering the weights assigned to the one or more query-based features.

2. The system of claim 1, wherein the online system hosts a social networking service including the member profiles, and wherein the identified query intent clusters include skills clusters.

3. The system of claim 1, wherein the obtaining comprises:
   obtaining one or more profiles of current candidates having a given title; and
   obtaining one or more profiles of current candidates having titles synonymous with the given title.

4. The system of claim 3, wherein the given title is selected by a user, and wherein the obtaining further comprises retrieving the titles synonymous with the given title from a data store on the storage device that maps titles to their synonyms.

5. The system of claim 1, wherein the selecting includes using the trained machine learned model to determine one arm from a set of arms, wherein each arm of the trained machine learned model corresponds to a different identified query intent cluster, the trained machine learned model returning a reward from an estimated distribution of each arm, wherein the reward is feedback received from a user via for a ranked set of results from a prior search query generated based on an arm.

6. The system of claim 1, wherein the extracting comprises:
   extracting skills from the one or more current candidate member profiles; and
   mapping the extracted skills to skill identifiers.

7. The system of claim 1, wherein the identifying comprises:
   creating a skills taxonomy for the skill identifiers; and
   representing each skill identifier in the skills taxonomy as a categorical variable that is either absent or present in a member profile.

8. A computer-implemented method, comprising:
   obtaining training data;
   dividing the training data into a positive class and a negative class, wherein the positive class includes data associated with items of a particular category and the negative class includes data associated with items not of the particular category;
   sampling the training data by oversampling the positive class with respect to the negative class;
   use the sampled training data to train a machine learned model using a machine learning algorithm, the training assigning weights to one or more query-based features;
   obtaining one or more current candidate member profiles used as a basis for a search on member profiles in an online system having a plurality of members;
   extracting one or more attributes from the one or more current candidate member profiles;
   identifying a plurality of query intent clusters based on the extracted one or more attributes;
   selecting, using the machine learned model, one of the plurality of identified query intent clusters based on one or more criteria evaluated for the plurality of identified query intent clusters;
   generating a search query based on the selected one of the one or more identified query intent clusters;
   causing a search to be performed based on the search query, returning a recommended member profile;
   receiving one or more refinements of the search query; and
   retraining the machine learned model based on the one or more refinements, altering the weights assigned to the one or more query-based features.

9. The method of claim 8, wherein the online system hosts a social networking service including the member profiles, and wherein the identified query intent clusters include skills clusters.

10. The method of claim 8, wherein the obtaining comprises:
    obtaining one or more profiles of current candidates having a given title; and
    obtaining one or more profiles of current candidates having titles synonymous with the given title.

11. The method of claim 10, wherein the given title is selected by a user, and wherein the obtaining further comprises retrieving the titles synonymous with the given title from a database table that maps titles to their synonyms.

12. The method of claim 1, wherein the selecting includes using a trained machine learned model to determine one arm from a set of aims, wherein each aim of the trained machine learned model corresponds to a different identified query intent cluster, the trained machine learned model returning a reward from an estimated distribution of each arm, wherein the reward is feedback received from a user via for a ranked set of results from a prior search query generated based on an arm.

13. The method of claim 8, further comprising:
    performing the search on the member profiles in the social networking service using the generated search query, returning one or more result member profiles as candidates.

14. The method of claim 8, wherein the extracting comprises:
    extracting skills from the one or more current candidate member profiles; and
    mapping the extracted skills to skill identifiers.

15. The method of claim 14, wherein the identifying comprises performing query intent clustering for the skill identifiers.

16. The method of claim 15, wherein the identifying comprises creating a skills taxonomy for the skill identifiers; and
    representing each skill identifier in the skills taxonomy as a categorical variable that is either absent or present in a member profile.

17. A non-transitory machine-readable storage medium comprising instructions that, when executed by one or more processors of a machine, cause the machine to perform operations including:
    obtaining training data;
    dividing the training data into a positive class and a negative class, wherein the positive class includes data associated with items of a particular category and the negative class includes data associated with items not of the particular category;
    sampling the training data by oversampling the positive class with respect to the negative class;
    use the sampled training data to train a machine learned model using a machine learning algorithm, the training assigning weights to one or more query-based features;
    obtaining one or more current candidate member profiles used as a basis for a search on member profiles in an online system having a plurality of members;
    extracting one or more attributes from the one or more current candidate member profiles;
    identifying a plurality of query intent clusters based on the extracted one or more attributes;
    selecting, using the machine learned model, one of the plurality of identified query intent clusters based on one or more criteria evaluated for the plurality of identified query intent clusters;
    generating a search query based on the selected one of the one or more identified query intent clusters;

causing a search to be performed based on the search query, returning a recommended member profile;
receiving one or more refinements of the search query; and
retraining the machine learned model based on the one or more refinements, altering the weights assigned to the one or more query-based features.

18. The machine-readable storage medium of claim 17, wherein the online system hosts a social networking service including the member profiles, and wherein the identified query intent clusters include skills clusters.

19. The machine-readable storage medium of claim 17, wherein identifying the query intent clusters comprises:
performing query intent clustering for the skill identifiers;
creating a skills taxonomy for the skill identifiers; and
representing each skill identifier in the skills taxonomy as a categorical variable that is either absent or present in a member profile.

* * * * *

UNITED STATES PATENT AND TRADEMARK OFFICE
CERTIFICATE OF CORRECTION

PATENT NO. : 11,017,040 B2  
APPLICATION NO. : 15/852523  
DATED : May 25, 2021  
INVENTOR(S) : Dialani et al.

Page 1 of 1

It is certified that error appears in the above-identified patent and that said Letters Patent is hereby corrected as shown below:

In the Claims

In Column 34, Line 40, in Claim 1, after "respect", insert --to the--

In Column 34, Line 42, in Claim 1, delete "algorithms," and insert --algorithm,-- therefor In Column 36, Line 13, in Claim 12, delete "aims," and insert --arms,-- therefor In Column 36, Line 13, in Claim 12, delete "aim" and insert --arm-- therefor Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*